(12) United States Patent
Ishikawa

(10) Patent No.: US 10,471,519 B2
(45) Date of Patent: Nov. 12, 2019

(54) CHUCK MECHANISM, STAIR FORM MEMBER ATTACHED JAW AND MACHINE TOOL

(71) Applicant: Synthe Tech Inc., Kashiwa-shi, Chiba (JP)

(72) Inventor: Yoshiaki Ishikawa, Kashiwa (JP)

(73) Assignee: SYNTHE TECH INC., Kashiwa-Shi, Chiba (JP)

( * ) Notice: Subject to any disclaimer, the term of this patent is extended or adjusted under 35 U.S.C. 154(b) by 0 days.

(21) Appl. No.: 15/739,882

(22) PCT Filed: Mar. 27, 2017

(86) PCT No.: PCT/JP2017/012280
§ 371 (c)(1),
(2) Date: Dec. 26, 2017

(87) PCT Pub. No.: WO2017/199584
PCT Pub. Date: Nov. 23, 2017

(65) Prior Publication Data
US 2018/0185929 A1    Jul. 5, 2018

(30) Foreign Application Priority Data
May 16, 2016   (JP) ................................ 2016-097642

(51) Int. Cl.
*B23B 31/16*       (2006.01)
*B23B 31/10*       (2006.01)
(Continued)

(52) U.S. Cl.
CPC ...... *B23B 31/16279* (2013.01); *B23B 31/001* (2013.01); *B23B 31/102* (2013.01);
(Continued)

(58) Field of Classification Search
CPC ............ B23B 31/16279; B23B 31/001; B23B 31/102; B23B 2231/28; B23B 2231/34; Y10T 279/1993; Y10T 279/1986
See application file for complete search history.

(56) References Cited

U.S. PATENT DOCUMENTS

| | | | |
|---|---|---|---|
| 1,873,476 A | 8/1932 | Procunier | |
| 2,667,358 A * | 1/1954 | Highberg | .......... B23B 31/16279 279/110 |

(Continued)

FOREIGN PATENT DOCUMENTS

| | | |
|---|---|---|
| DE | 1288872 | 2/1969 |
| EP | 0 512 230 | 3/1992 |

(Continued)

OTHER PUBLICATIONS

International Search Report dated May 30, 2017 issued in PCT International Patent Application No. PCT/JP2017/012280 and English translation, 3 pp.

(Continued)

*Primary Examiner* — Eric A. Gates
(74) *Attorney, Agent, or Firm* — Nixon & Vanderhye P.C.

(57) ABSTRACT

A stair form member attached jaw is installed with the stair form member provided at the bottom face of the soft jaw. The stair form member is held between a pair of grips in the jaw installing groove of the master jaw from both sides of the radial direction, thereby pulling the stair form member to the bottom direction of the jaw installing groove. The position of the radial direction of the soft jaw is determined by the engagement between the bottom face of the soft jaw and the upper serration faces of the master jaw; and the position of the soft jaw in the tangent line is determined by the close contact of the stair form member to the side face of the jaw installing groove.

8 Claims, 27 Drawing Sheets

(51) Int. Cl.
  *B23B 31/00*   (2006.01)
  *B23Q 11/08*   (2006.01)
(52) U.S. Cl.
  CPC ....... *B23B 2231/28* (2013.01); *B23B 2231/34* (2013.01); *B23B 2260/056* (2013.01); *B23B 2260/136* (2013.01); *B23Q 11/08* (2013.01); *Y10T 279/1986* (2015.01); *Y10T 279/1993* (2015.01)

(56) References Cited

U.S. PATENT DOCUMENTS

| | | | |
|---|---|---|---|
| 2,903,268 A | | 9/1959 | Buck et al. |
| 3,219,356 A | | 11/1965 | Wilterdink et al. |
| 3,251,606 A | | 5/1966 | Oswald et al. |
| 3,679,221 A | | 7/1972 | Behrens |
| 3,868,120 A | * | 2/1975 | Blattry ............... B23B 31/16279 279/123 |
| 4,644,636 A | * | 2/1987 | Link ................. B23B 31/16279 483/20 |
| 4,667,971 A | * | 5/1987 | Norton .............. B23B 31/16245 279/121 |
| 4,725,173 A | | 2/1988 | Hoffman et al. |
| 4,982,970 A | * | 1/1991 | Otani ................ B23B 31/16279 279/121 |
| 5,330,205 A | * | 7/1994 | Norton .............. B23B 31/16245 279/124 |
| 8,833,773 B2 | * | 9/2014 | Allis ................. B23B 31/16279 279/106 |
| 8,984,995 B2 | * | 3/2015 | D'Ancona ................ B23B 3/14 82/165 |
| 2001/0048204 A1 | * | 12/2001 | Sida ................. B23B 31/16279 279/124 |
| 2008/0018060 A1 | | 1/2008 | Ishii et al. |
| 2011/0277602 A1 | | 11/2011 | Kobayasi |

FOREIGN PATENT DOCUMENTS

| | | |
|---|---|---|
| GB | 1071055 | 6/1967 |
| JP | 2000-288809 | 10/2000 |
| JP | 2003-175410 | 6/2003 |
| JP | 2009-12155 | 1/2009 |
| JP | 2011-167821 | 9/2011 |
| KR | 10-0641874 | 10/2006 |

OTHER PUBLICATIONS

Extended European Search Report dated Feb. 12, 2019 issued in European Patent Application No. 17799018.1, 18 pp.

* cited by examiner

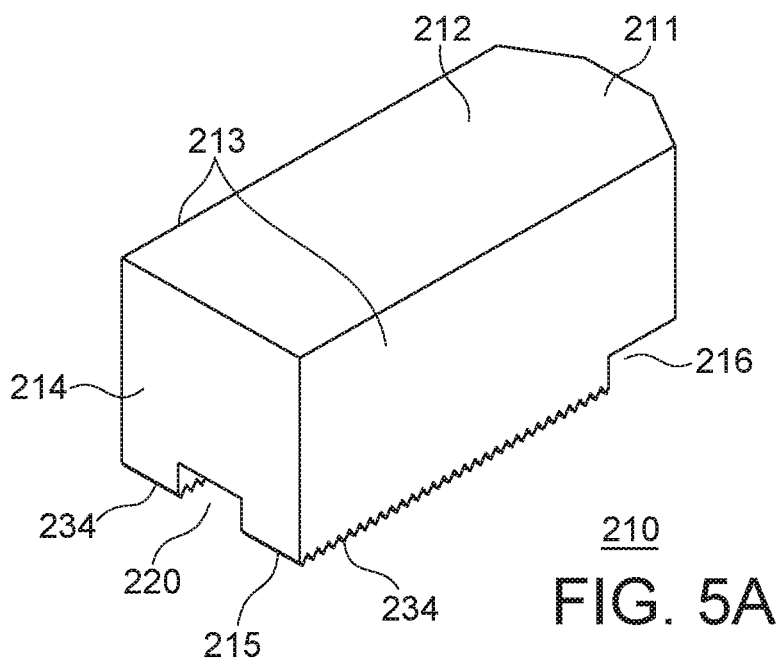
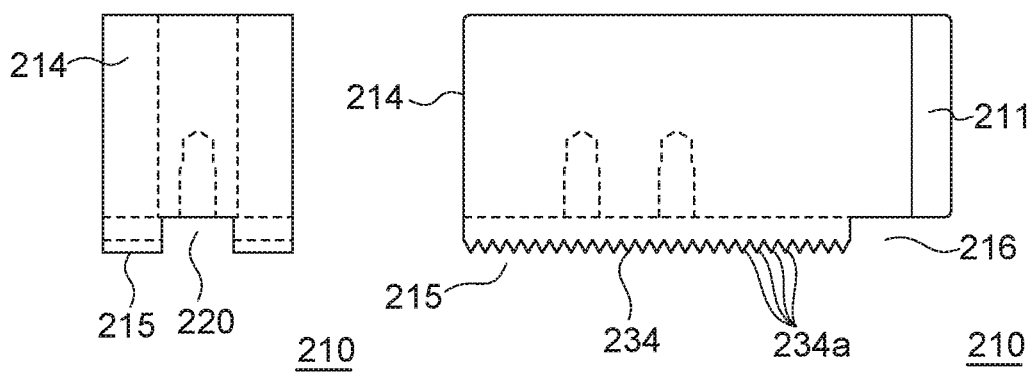
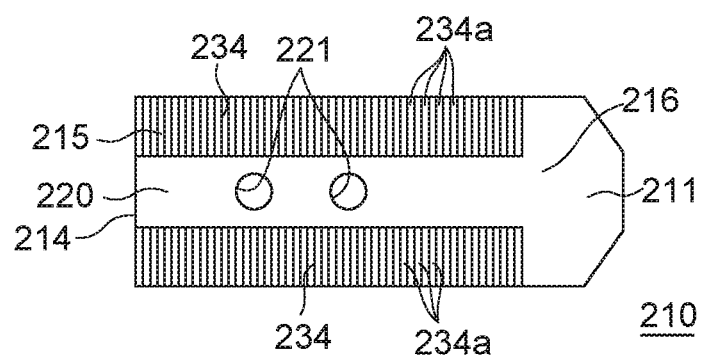

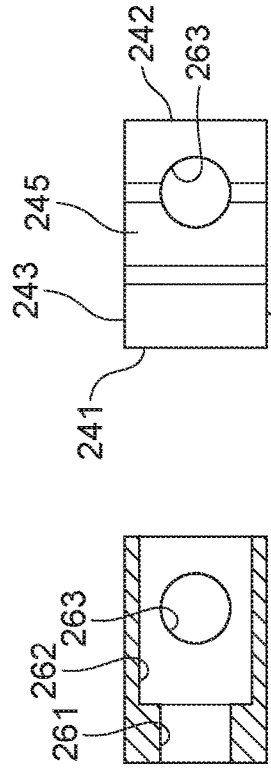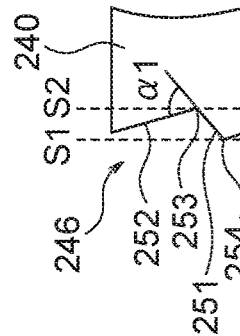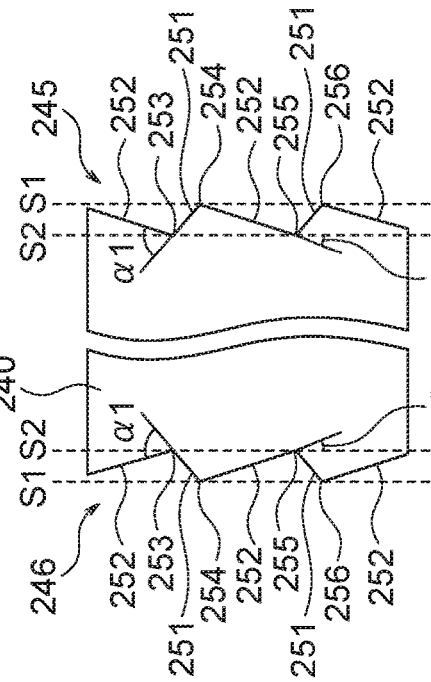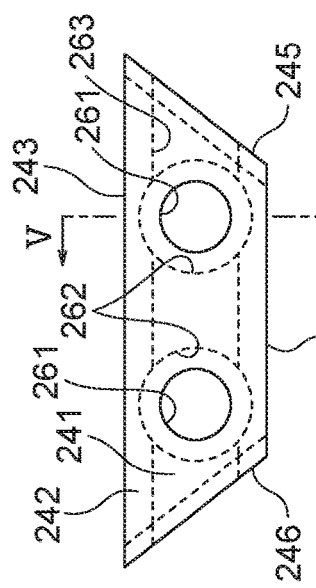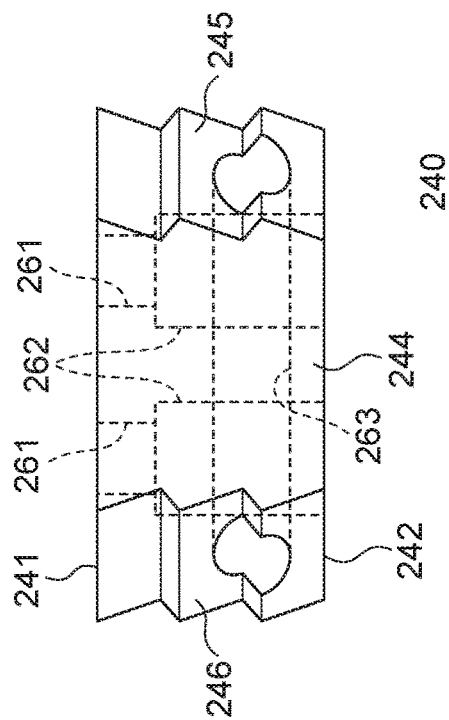

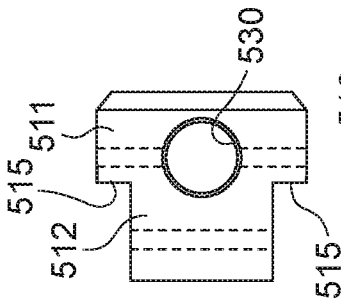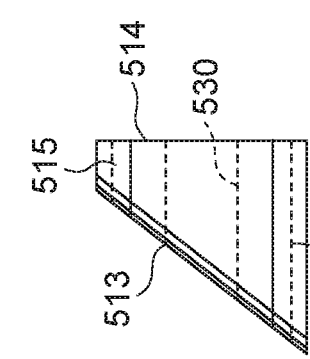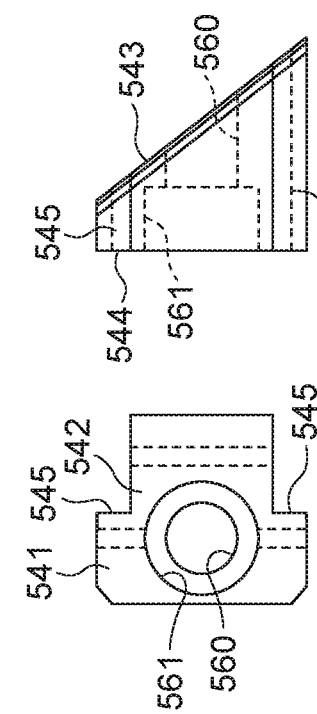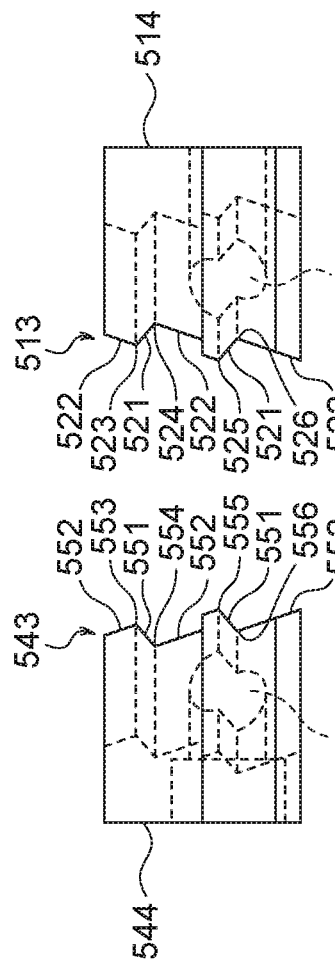

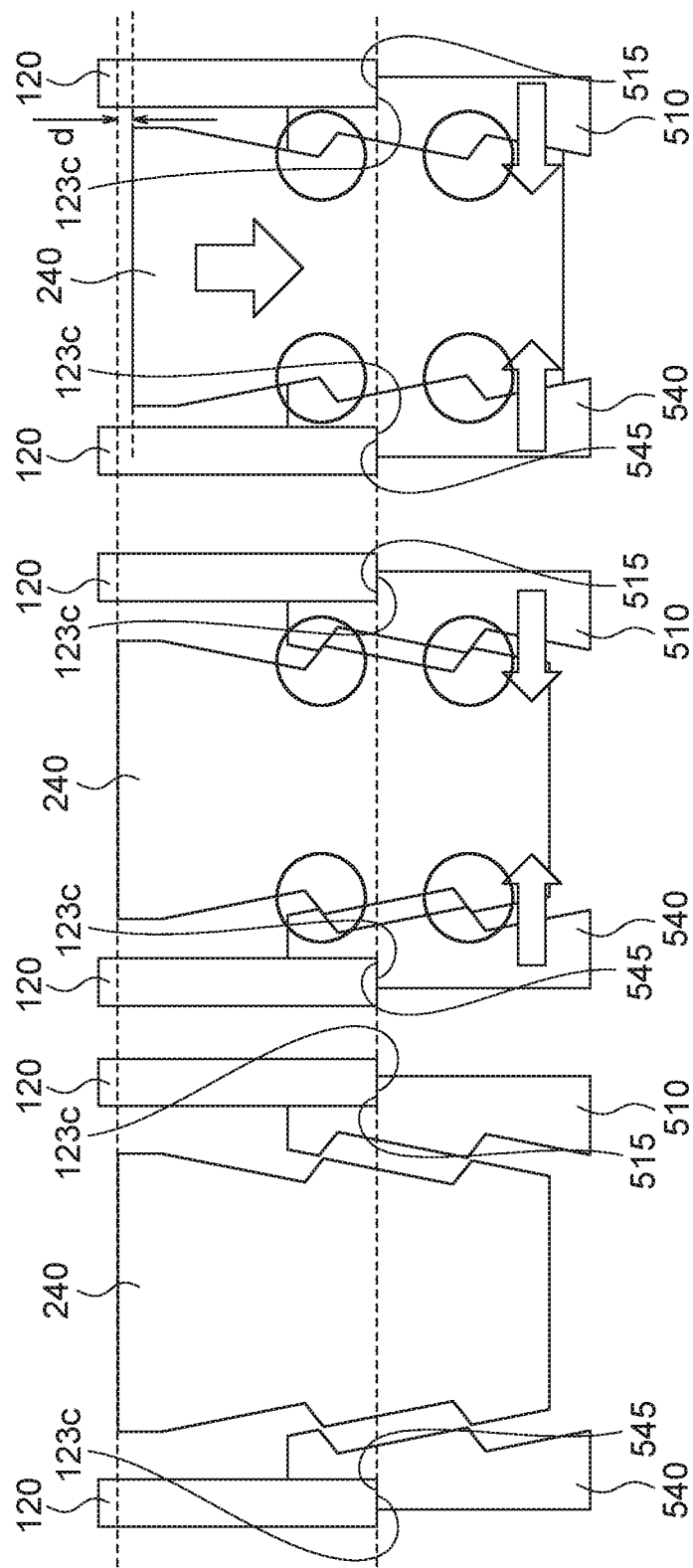

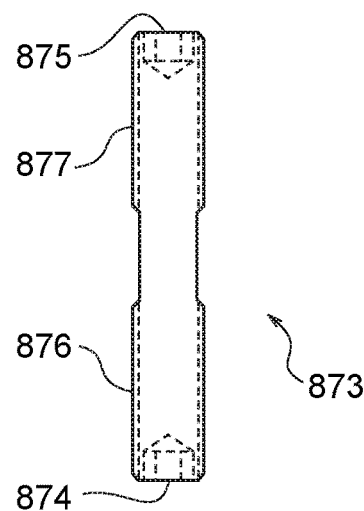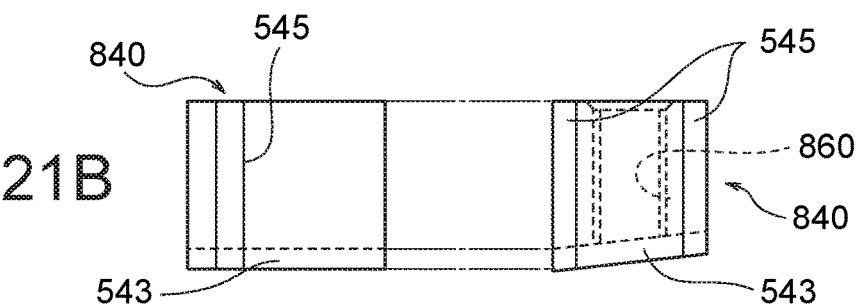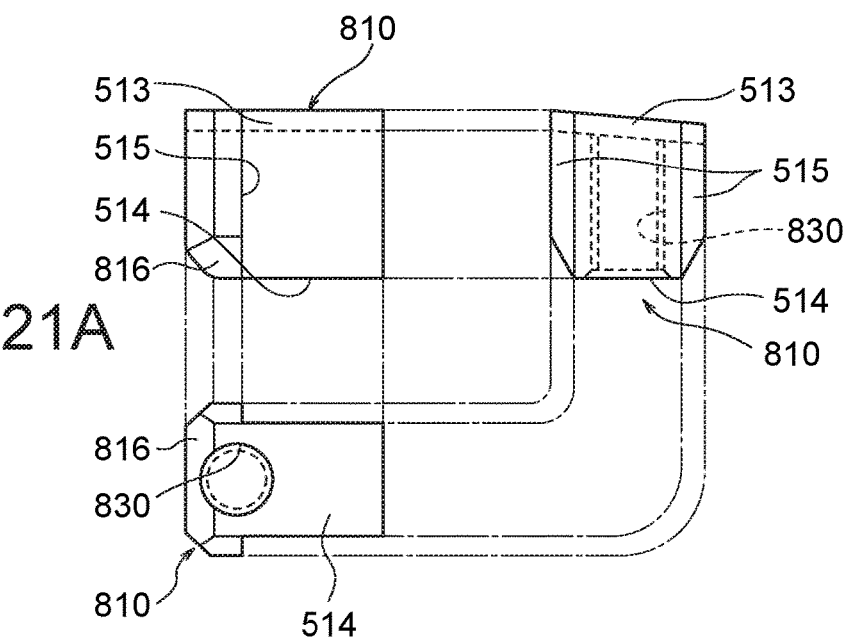

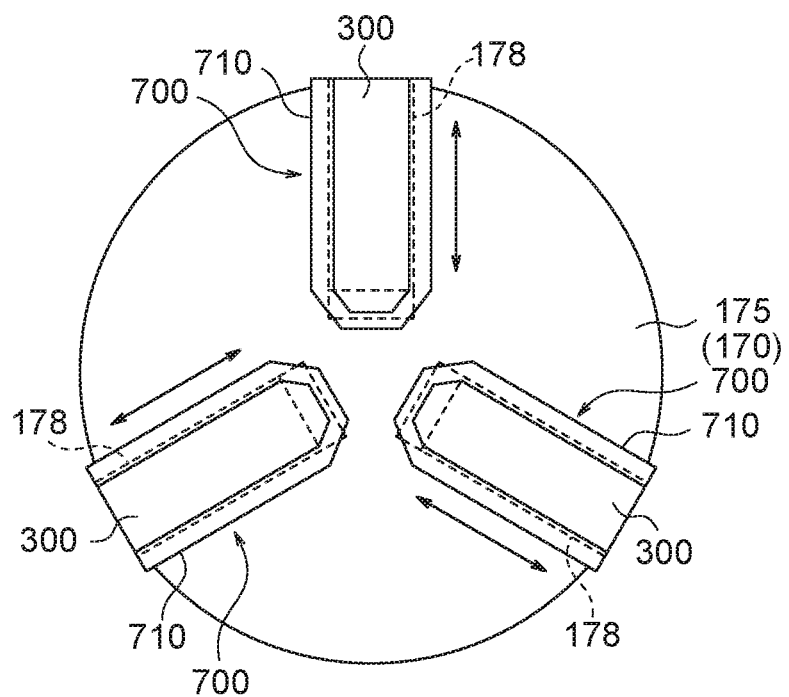
FIG. 25A
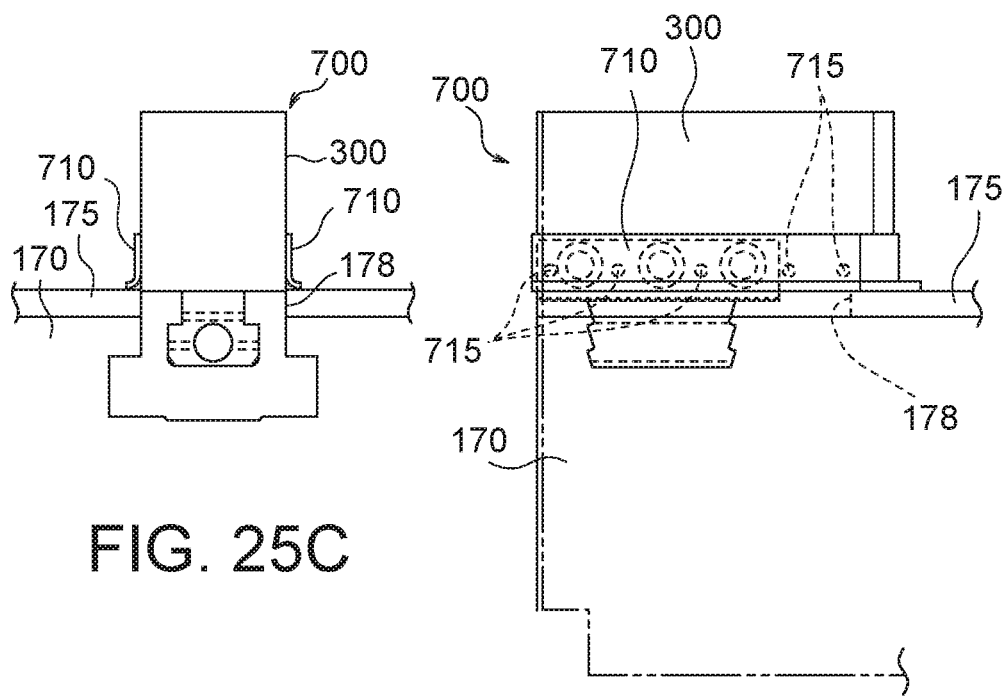
FIG. 25C
FIG. 25B

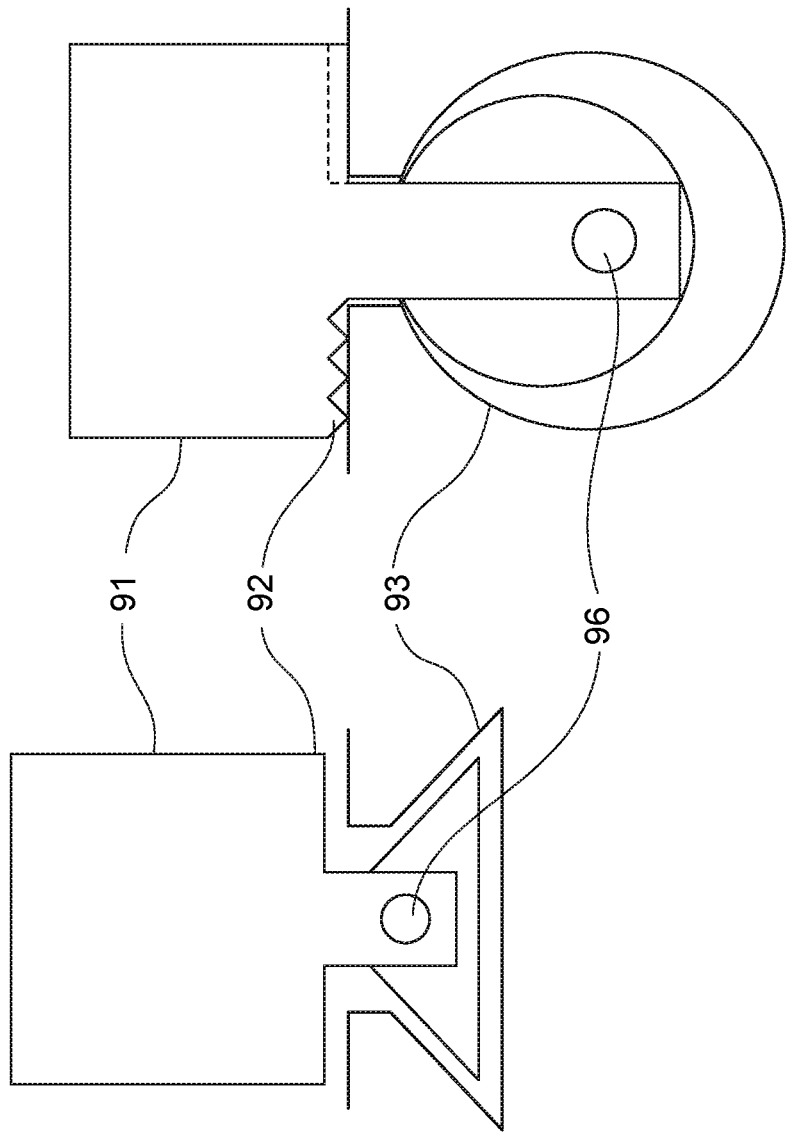

CHUCK MECHANISM, STAIR FORM MEMBER ATTACHED JAW AND MACHINE TOOL

TECHNICAL FIELD

The present invention relates to a chuck mechanism for holding a workpiece and fixing workpiece to a machine tool such as a lathe or so, and also relates to a stair form member attached jaw used for this, and a machine tool comprising thereof.

BACKGROUND ART

For the chuck mechanism of a machine tool such as a lathe or so (for example see Patent document 1), in order to carry out a highly precise processing to the workpiece, a centering of workpiece needs to be done with high precision, and/or when the workpiece is removed and installing it again, the centering of the workpiece needs to be done accurately even in case of repeating. As the chuck which can correspond to such demand, a chuck mechanism has been proposed such that plurality of serrations are formed which extend in different directions of the face contacting with a master jaw, and by engaging these, the soft jaw prevents the shifting in the plane direction of the contacting face between the master jaw (for example, see Patent document 2).

PRIOR ART REFERENCES

Patent document 1: JP Patent Application Laid Open No. 2000-288809
Patent document 2: JP Patent No. 4273218

DISCLOSURE OF INVENTION

Problem to be Solved by the Invention

In case of carrying out a highly precise processing to the workpiece, it is important that the processing is done under a clean environment of which waste and dust do not exist around a workpiece processing part or the chuck mechanism. However, in the conventional chuck mechanism, a relatively large counterbore is formed for inserting a bolt to the soft jaw or a top jaw, thus cutting scraps or so generated during a cutting processing or so enters into this counterbore, and this could cause a trouble during a subsequent step.

Also, the processing of the workpiece using the machine tool is desired to be done efficiently because the cost of the product or so is directly influenced. However, for the conventional chuck mechanism, usually one workpiece is held by three soft jaws, and one soft jaw is mounted on the master jaw by two installing bolts, thus in order to change the soft jaw, 6 times of uninstalling and 6 times of installing are needed, that is total of 12 times of process are needed, thus the processing is complicate and has caused the decreased efficiency.

The object of the invention is to provide the chuck mechanism, the stair form member attached jaw and the machine tool capable of highly precisely centering the workpiece, also capable of centering the workpiece with high reproducibility; capable of efficiently carrying out the installing and uninstalling, and efficiently carrying out exchange of the jaw; further having low possibility of unnecessary substances such as cutting scrap or so existing around the chuck mechanism; and allowing highly precise and stable processing.

Means for Solving the Objects

In order to attain the above mentioned object, the chuck mechanism of the present invention is a chuck mechanism holding a workpiece, wherein said chuck mechanism comprising, a chuck main body, plurality of master jaws provided to an end face of said chuck main body, and each of said plurality of master jaws comprising a jaw installing groove extending in a radial direction of the end face of said chuck main body, a stair form member attached jaw provided to each of said master jaws, and comprising a stair form member inserted in said jaw installing groove of said master jaw, a pair of grips inserted to each of said jaw installing grooves of said master jaws, and holding said stair form member of said stair form member attached jaw from an inner diameter side and an outer diameter side of said jaw installing groove, and a positioning part formed at a upper part of said master jaw and a lower part of said jaw to determine a position of said jaw at the end face of said chuck main body, wherein the inner diameter side end face and the outer diameter side end face of said stair form member are formed with an engaging face comprising an inclined face to a direction of an upper opening direction of said jaw installing groove when said stair form member is inserted to said jaw installing groove of said master jaw, the end face opposing to said inner diameter side end face or said outer diameter side end face of each said stair form member of said pair of grips are formed with an opposing engaging face contacting with said engaging face of said stair form member to act a force on said engaging face towards a direction of a bottom of said jaw installing groove when said stair form member is held, and each of said pair of grips comprises an locking part contacting with a predetermined locking part of said jaw installing groove of said master jaw to regulate a movement of said grip to an opposite direction Also, the stair form member attached jaw of the present invention is a stair form member attached jaw provided on a master jaw, wherein said stair form member attached jaw comprising, a stair form member capable of being inserted in a jaw installing groove of said master jaw and said jaw installing groove extending in radial direction at an end face of a chuck main body, a jaw for holding a workpiece, and integrally formed with said stair form member, and a positioning part formed at a lower part of said jaw, and said positioning part engages with a positioning part formed at a upper part of said master jaw to determine a position of said jaw at the side face of said chuck main body, wherein said inner diameter side end face and said outer diameter side end face of said stair form member are respectively formed with one or plurality of engaging face which is an inclined face towards a upper part opening direction of said jaw installing groove when said stair form member is inserted in said jaw installing groove of said master jaw.

Also, the machine tool of the present invention comprises the chuck mechanism of the present invention.

Effects of the Invention

According to the present invention, the chuck mechanism, the stair form member attached jaw and the machine tool capable carrying out highly precise centering of the workpiece with high reproducibility; capable of efficiently carrying out the installing, uninstalling, and exchange of the jaw; having low possibility of unnecessary substances such as cutting scraps or so existing around the chuck mechanism; and allowing highly precise and stable processing can be provided.

BRIEF DESCRIPTION OF DRAWINGS

FIG. 4A is a perspective view of a partial cross section of the stair form member attached jaw.

FIG. 4B is a diagram of the stair form member attached jaw provided to the master jaw viewing towards the end face external direction of the chuck main body from the inside of the chuck main body (bottom view).

FIG. 4C is the diagram of the stair form member attached jaw viewing towards the direction of a tangent line which is parallel to an end face of the chuck main body (side view).

FIG. 4D is a diagram of the stair form member attached jaw viewing from the outer diameter side in the radial direction which is parallel to the end face of the chuck main body (front view).

FIG. 5A to FIG. 5D are diagram showing the structure of the jaw of the stair form member attached jaw shown in FIG. 4A, and FIG. 5A is the perspective view of the jaw.

FIG. 5B is the bottom view of the jaw.

FIG. 5C is the side view of the jaw.

FIG. 5D is the front view of the jaw.

FIG. 7A to FIG. 7E are diagrams showing the structure of the stair form member shown in FIG. 6, and FIG. 7A is a diagram of the stair form member of the stair form member attached jaw provided to the master jaw viewing from the surface side of the end face of the chuck main body (plan view).

FIG. 7B is the side view of the stair form member.

FIG. 7C is the cross section view of the stair form member along V-V of FIG. 7A.

FIG. 7D is a diagram of the stair form member viewing from an inner circumference side in the radial direction of the end face and in parallel with the end face of the chuck main body (rear view).

FIG. 7E is a schematic diagram describing the wave shape engaging face of the stair form member.

FIG. 8A is the perspective view of the rear grip.

FIG. 8B is a perspective view of the front grip.

FIG. 9A to FIG. 9F are the diagrams showing the structure of the grips shown in FIG. 8, and FIG. 9A is the plan view of the rear grip.

FIG. 9B is the rear view of the rear grip.

FIG. 9C is the side view of the rear grip.

FIG. 9D is the plan view of the front grip.

FIG. 9E is the front view of the front grip.

FIG. 9F is the side view of the front grip.

FIG. 10A is the side view.

FIG. 10B is the plan view.

FIG. 11A is the side view.

FIG. 11B is the plan view.

FIG. 12A is the side view.

FIG. 12B is the plan view.

FIG. 13A to FIG. 13C are the schematic diagrams describing that a soft jaw can be positioned accurately by holding the stair form member with the grips, and FIG. 13A is the first diagram.

FIG. 13B is the second diagram.

FIG. 13C is the third diagram.

FIG. 15A is the perspective view of partial cross section of the stair form member attached jaw.

FIG. 15B is the side view of the stair form member.

FIG. 15C is front view.

FIG. 16A is the perspective view of the partial cross section of the stair form member attached jaw main body.

FIG. 16B is the perspective view of a bilateral serration piece.

FIG. 16C is the figure of serration of the bilateral serration piece.

FIG. 16D is the perspective view of the vertical serration piece.

FIG. 16E is the figure of the serration of the vertical serration piece.

FIG. 17A is the perspective view of the rear grip.

FIG. 17B is the perspective view of the front grip.

FIG. 18A is the stair form member attached jaw of the third embodiment based on the stair form member jaw of the first embodiment.

FIG. 18B is a diagram of the stair form member attached jaw of the third embodiment based on the stair form member attached jaw of the second embodiment.

FIG. 19A is the first diagram.

FIG. 19B is the second diagram.

FIG. 19C is the third diagram.

FIG. 20A shows the stair form member attached jaw being held.

FIG. 20B shows the stair form member attached jaw being released.

FIG. 20C is a modified example of the stair form member and the grips.

FIG. 21A to FIG. 21C are the diagrams showing the constitution of the grips and the clamping blot of the fifth embodiment of the present invention, and FIG. 21A is the diagram showing the constitution of the rear grip.

FIG. 21B is the diagram showing the constitution of the front grip.

FIG. 21C is the diagram showing the constitution of the clamping bolt.

FIG. 22A shows the stair form member being held.

FIG. 22B shows the stair form member being released.

FIG. 23A is the first diagram.

FIG. 23B is the second diagram.

FIG. 23C is the third diagram.

FIG. 24A is the first stair form member attached jaw thereof.

FIG. 24b is the second stair form member attached jaw.

FIG. 25A to FIG. 25C are the diagrams showing the constitution of the stair form member attached jaw and the chuck main body of the seventh embodiment of the present invention, and FIG. 25A is the plan view wherein the plate and the stair form member attached jaw are provided to the chuck main body.

FIG. 25B is the side view of which the plate and the stair form member attached jaw are provided to the chuck main body.

FIG. 25C is the front view of which the plate and the stair form member attached jaw are provided to the chuck main body.

FIG. 26A is the side view of the stair form member attached jaw thereof.

FIG. 26B is the bottom view of the stair form member attached jaw of other embodiment.

FIG. 26C is the pull stud bolt used for the stair form member attached jaw of other embodiment.

FIG. 27A and FIG. 27B are the diagrams of other embodiment of a locking part of the chuck mechanism, and FIG. 27A is the locking part having a dovetail shape.

FIG. 27B is the locking part having a round groove shape.

MODES FOR CARRYING OUT THE INVENTION

First Embodiment

Figure 1:
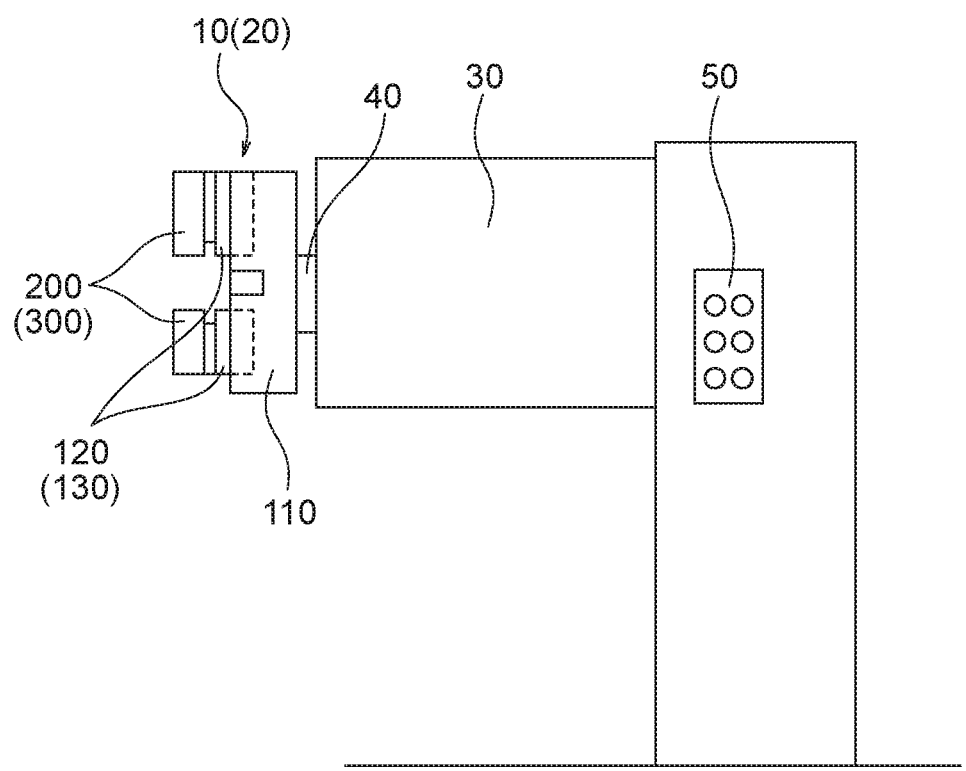
FIG. 1 is a schematic diagram showing a basic constitution of a lathe of one embodiment of the present invention.

The first embodiment of the present invention will be explained by referring to FIG. 1 to FIG. 13. In this embodiment, as one example of the machine tool of the present invention, the lathe using the stair form member attached jaw and the chuck mechanism will be described. Note that, for the description of each of the following embodiments including the first embodiment, the same or similar constitution will be given a same numerical reference, and the overlapping parts between the embodiments will be omitted from explaining. As shown in FIG. 1, a lathe 1 of the present invention comprises a chuck mechanism 10 holding a workpiece as the object to be processed, a motor 30 which rotates the chuck mechanism 10, a spindle (shaft) 40 which transmit the rotational driving force of the motor 30 to the chuck mechanism 10 and a control unit 50 controlling the motor 30.

Figure 2:
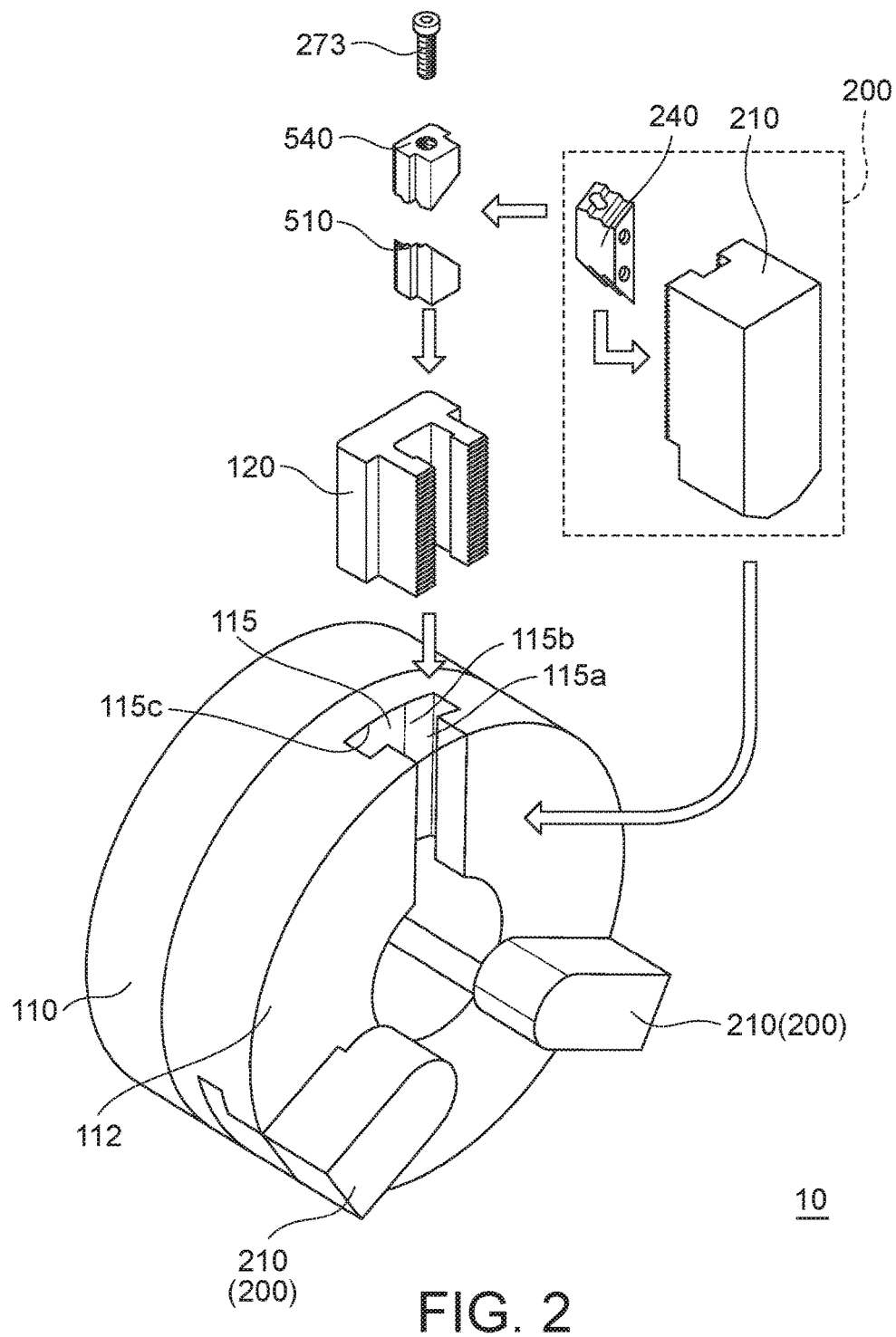
FIG. 2 is an exploded perspective view of a chuck mechanism of the lathe shown in FIG. 1.

As shown in FIG. 2, the chuck mechanism 10 comprises a chuck main body 110 of a cylindrical shape, three master jaws 120 installed to the chuck main body 110, three stair form member attached jaws 200 provided to the master jaws 120, a pair of grips 510, 540 for fixing the stair form member attached jaws 200 to the master jaws 120, and clamping bolt 273 for connecting the pair of grips 510, 540.

At an end face 112 of the chuck main body 110, master jaw insertion grooves 115 for installing the master jaws 120 are formed. The master jaw insertion groove 115 has a cross section of T-shape which comprises a bottom part 115a having a wide width and an upper part 115b having narrower width than the bottom part 115a.

Figure 3:
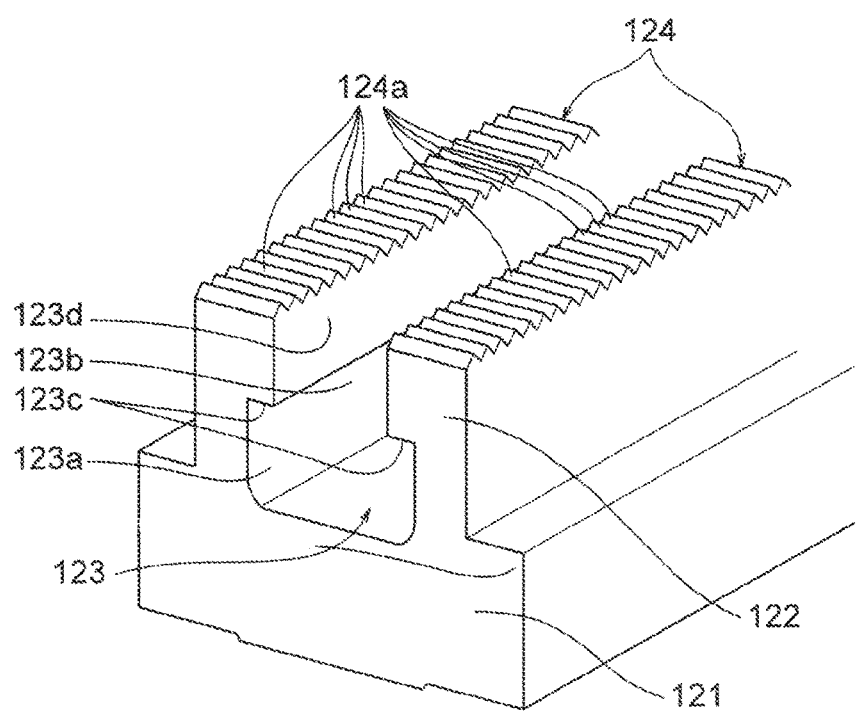
FIG. 3 is a perspective view of a master jaw of the chuck mechanism shown in FIG. 2.

The master jaw 120 is a receiving base for installing the stair form member attached jaw 200 to the chuck main body 110. As shown in FIG. 3, the master jaw 120 is a metallic member having a planar shape of rectangular shape, and having a cross section of T-shape which comprises a base part 121 having a wide width and a upper part 122 having narrower width than the base part 121. The base part 121 has a shape and size for being inscribed and housed in the base part 115a of the master jaw insertion groove 115 of the chuck main body 110. The upper part 122 has a width for being inscribed in the upper part 115b of the master jaw insertion groove 115. The height of the upper part 122 is slightly higher than the height of the upper part 115b of the master jaw insertion groove 115. Therefore, when the master jaw 120 is provided to the chuck main body 110, an upper most part of the master jaw 120 will slightly project out from the end face 112 of the chuck main body 110.

The master jaw 120 is formed with the jaw installing groove 123 for installing the stair form member attached jaw 200. The jaw installing groove 123 is formed so as to extend along the longitudinal direction of the master jaw 120, and has a cross section of T-shape comprising a bottom part 123a having a wide width and a upper part 123b having a narrower width than the bottom part 123a. Since the bottom part 123a is wider than the upper part 123b in the jaw installing groove 123, a step face 123c (this may be referred as a shoulder part. Also, this corresponds to the locking part recited in claims) facing downward is formed at the boundary between the upper part 123b and the bottom part 123a. The step face 123c works as a supporting face (the supporting face for pulling down) when the stair form member attached jaw is pulled down.

Also, a side face 123d which is one of the pair of side faces opposed each other and forming the jaw installing groove 123 of the master jaw 120 works as a position defining face (a stair form member position defining face) determining the position of the stair form member 240 of the stair form member attached jaw 200. As discussed in below, the stair form member 240 of the stair form member attached jaw 200 is inserted in the jaw installing groove 123, and the stair form member 240 is held and tightened between the grips 510, 540; thereby the stair form member 240 is moved to the direction of the first side face 243 (the positioning standard side face) (see FIG. 4B). Here, the side face of the jaw installing groove 123 to which the positioning standard side face 243 of the stair form member 240 is contacted and pressed is the stair form member position defining face 123d. In the present embodiment, among the opposing side faces of the jaw installing groove 123, the side face 123d which is at the left side with respect to the chuck main body 110 is the stair form member position defining face. However, in case of using the stair form member attached jaw constituted so that it can be installed to the chuck main body while the inner diameter and outer diameter direction are switched as described in the fifth embodiment, then the side face opposing the side face 123*d* may be the stair form member position defining face.

At each of the both sides of the jaw installing groove 123 of the top face of the master jaw 120, a serration face 124 is formed as the positioning part (the positioning part of the top face of the master jaw) of the present invention. At the serration face 124, a serration is formed in which saw teeth 124*a* having a cross section of an approximate regular triangle and extending in perpendicular direction to the extending direction of the jaw installing groove 123 are aligned with a predetermined pitch along the extending direction (the direction perpendicular to the extending direction of the saw teeth 124*a*) of the jaw installing groove 123. As discussed in below, at the bottom face of the soft jaw 210 of the stair form member attached jaw 200, similar serration is formed as the positioning part (the positioning part of the bottom face of the jaw) of the present invention; and when the stair form member attached jaw 200 is installed to the master jaw 120, the serrations engage with each other. As a result, the soft jaw 210 can only move to the extending direction of the saw teeth 124*a* of the serration face 124, but cannot move to the aligning direction of the saw teeth 124*a*, thereby the soft jaw 210 is positioned in the radial direction of the end face 112 of the chuck main body 110. Note that, in the present embodiment, the pitch of the saw teeth 124*a* is 3 mm.

The master jaw 120 having such constitution are inserted to the master jaw insertion groove 115 from the outer circumference face of the chuck main body 110, thereby provided to the chuck main body 110. For example, at the center part of the chuck main body 110, a shifter having a wedge-shaped groove not shown in the figure is incorporated, and this engages with the lower part of the master jaw 120; thereby the master jaw 120 is installed to the chuck main body 110. In this structure, when the shifter slides along the axial direction of the chuck main body 110, the master jaws 120 slides along the radial direction of the chuck main body 110; thereby in case of changing or so of the workpiece, the master jaw 120 is moved to open state or close state.

Next, the stair form member attached jaw 200 will be explained by referring to FIG. 4A to FIG. 7E.

As shown in FIG. 4A to FIG. 4D, the stair form member attached jaw 200 of the present embodiment is an assembling type jaw which is formed integrally by assembling the soft jaw 210 for holding the workpiece with the stair form member 240 for mounting the soft jaw 210 to the master jaw 120.

As shown in FIG. 5A to FIG. 5D, the soft jaw 210 is a metallic member having approximately a rectangular parallelepiped shape. The material of the soft jaw 210 of the present embodiment is a carbon steel material such as S45C steel or so. A tip part of the soft jaw 210 is formed at a workpiece holding part 211 forming the workpiece holding face which holds the workpiece. In the present embodiment, the workpiece holding part 211 is an end face having a mountain shape, but it is not limited thereto, and it may be a flat end face, or an end face having a longer slope face with narrow and pointy tip. Note that, in case of grinding the workpiece with the lathe 1, in order to hold the workpiece while completely centering with the appropriate contact face of the three soft jaws 210, first the workpiece holding part 211 is ground to form the workpiece holding face to the workpiece holding part 211, then the workpiece is actually held and ground.

Figure 4A:
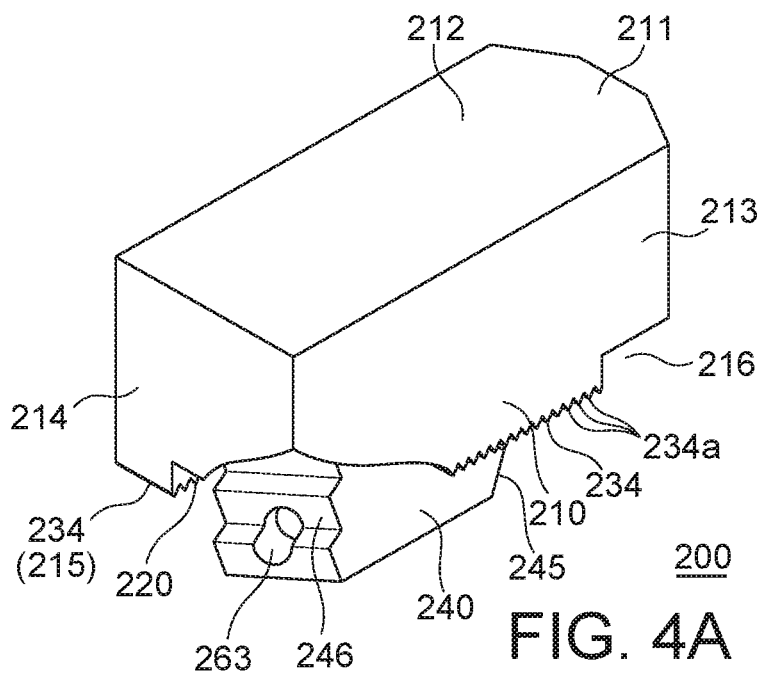
FIG. 4A to FIG. 4D show the structure of a stair form member attached jaw of the first embodiment.
Figures 4C, 4D:
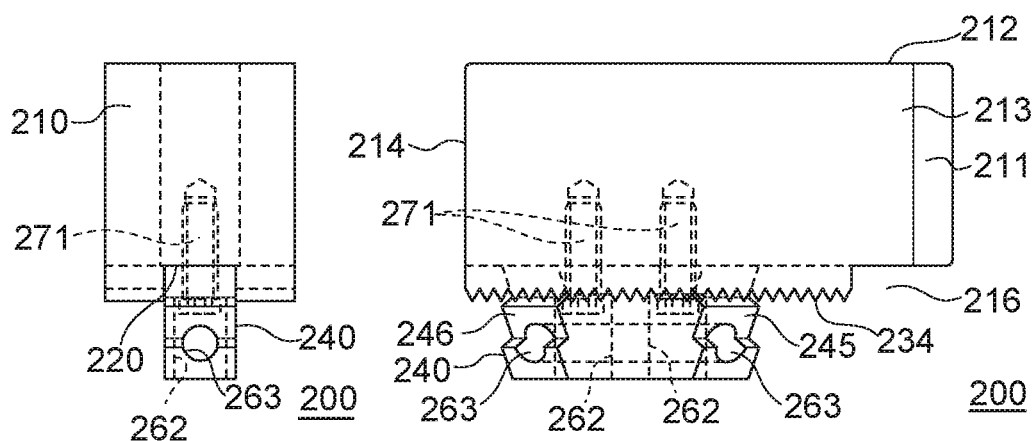
Figure 4B:
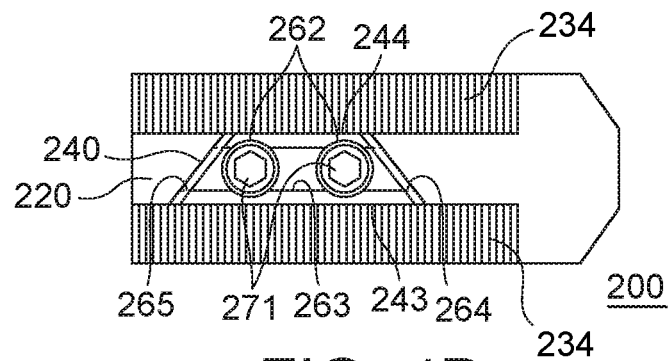

At the bottom face 215 of the soft jaw 210, a stair form member installing groove 220 for installing the stair form member 240 is formed. The stair form member installing groove 220 is a groove formed at the center part in a short direction of the soft jaw 210 along the longitudinal direction of the soft jaw 210 with a predetermined length from an outer circumference side end face 214, and having a cross section of rectangle and a predetermined depth; further as shown in FIG. 4D, it is a groove where a head part of the stair form member 240 engages. As shown in FIG. 5B, at the area near the center part of the stair form member installing groove 220, two screw holes 221 are formed so that a stair form member installing bolt 271 (see FIG. 4C) can be screwed in. The screw hole 221 is formed at the position corresponding to a stair form member installing bolt penetrating hole 261 of the stair form member 240 (see FIG. 6) which will be discussed in below.

At the both sides of the stair form member installing groove 220 of the bottom face 215 of the soft jaw 210, a serration face 234 is formed. As shown in FIG. 5B and FIG. 5C, at the serration face 234, a serration is formed in which saw teeth 234*a* having a cross section of an approximate regular triangle and extending in a perpendicular direction to the longitudinal direction of the soft jaw 210 are aligned with a predetermined pitch along the longitudinal direction of the soft jaw 210 (the direction perpendicular to the extending direction of the saw teeth 234*a*). The shape of each saw tooth 234*a* is the same as the shape of the saw tooth 124*a* of the serration face 124 of the master jaw 120, and the pitch of the saw teeth 234*a* is also the same as the pitch of the saw teeth 124*a* of the serration face 124 of the master jaw 120. When the stair form member attached jaw 200 is provided to the master jaw 120, the serration of this serration face 234 engages with the serration of the serration face 124 of the master jaw 120. As a result, the soft jaw 210 can only move in the extending direction of the saw teeth 234*a* of the serration face 234, but cannot move in the alignment direction of the saw teeth 234*a*; thus the position of the soft jaw 210 in the radial direction with respect to the master jaw 120 is defined with a high precision.

The end part of the workpiece holding part 211 of the bottom face 215 of the soft jaw 210 does not have the serration face 234 and is formed with a notch 216 having predetermined length and depth. The depth of the notch 216 in the present embodiment is the same as the bottom face of the stair form member installing groove 220. Also, the top face 212, the both side faces 213 and the outer circumference end face 214 of the soft jaw 210 are flat faces with no concavo-convex portion as shown in FIG. 5A. Conventionally, the bolt hole was formed at the top face of the jaw, however in the present invention, the stair form member 240 is provided to the soft jaw 210 from the bottom face 215 of the soft jaw 210, thus the top face 212 of the soft jaw 210 is not formed with the depression such as a bolt hole or so.

The stair form member 240 is a metallic member for providing the soft jaw 210 to the master jaw 120. Since the stair form member 240 is provided to the soft jaw 210 as shown in FIG. 4A, while the stair form member 240 is held between the grips 510, 540 and maintained in the jaw installing groove 123 of the master jaw 120 as discussed in below, the soft jaw 210 is fixed on the master jaw 120.

Figure 6:
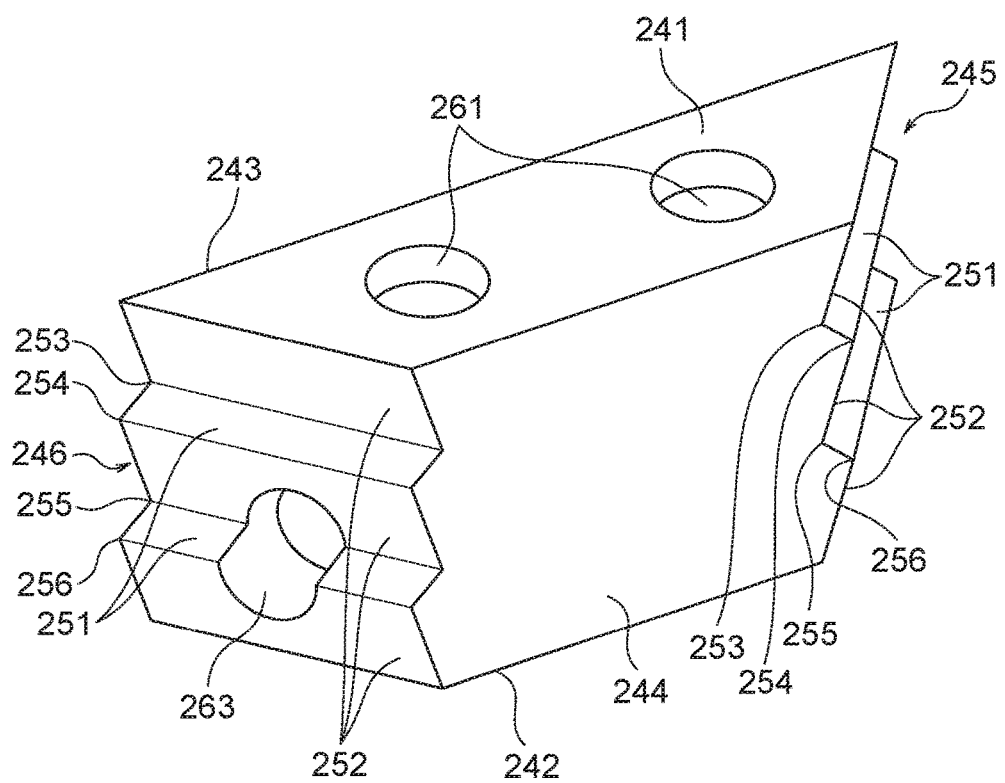
FIG. 6 is the perspective view of the stair form member of the stair form member attached jaw shown in FIG. 4A.
Figures 8A, 8B:
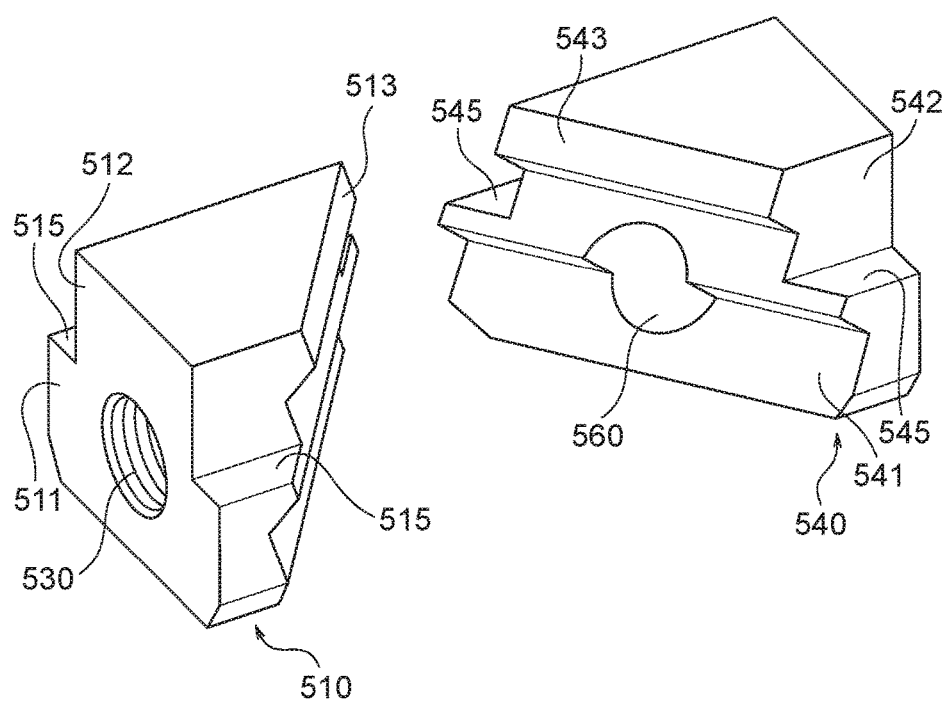
FIG. 8A and FIG. 8B are the diagrams showing the structure of the grips of the first embodiment.

The stair form member 240 is a member having a lone shape as shown in FIG. 6, and the planar shape thereof is an isosceles trapezoid shape as shown in the bottom view of FIG. 7A. As shown in FIG. 6 and FIG. 7, the stair form member 240 comprises the top face 241, the bottom face 242, the first side face 243 corresponding to the bottom side of the isosceles trapezoid shape, the second side face 244 corresponding to the upper side of the isosceles trapezoid shape, a rear side end face 245 (a rear side inclined face) placed at the tip side (the workpiece holding part 211 side) of the soft jaw 210, and the front side end face (a front side inclined face) 246 placed at the outer circumference side end face 214 of the soft jaw 210. The first side face 243 is tightly pressed against the stair form member position defining face 123d of the jaw installing groove 123 when the stair form member 240 is inserted to the jaw installing groove 123 of the master jaw 120 and held tightly between the grips 510, 540; thereby the first side face 243 works as a standard face (the positioning standard face) for accurately determining the position of the stair form member attached jaw 200 in the width direction (the tangent line direction at the end face 112 of the chuck main body 110).

The rear side inclined face 245 and the front side end face 246 of the stair form member 240 are respectively formed into a waveform engaging face of which the contact face 252 and the engaging face 251 are repeating. As shown in FIG. 7E, the waveform engaging face comprises the engaging faces 251 of two steps of the upper and lower steps, and the connecting faces 252 of three steps of the upper, middle and lower steps for connecting said two engaging faces 251. The connecting face 252 at the upper step and the engaging face 251 at the upper step are formed so as to respectively extend to the upper outside and lower outside from an upper groove part 253 which are depressed in. The engaging face 251 of the upper step and the connecting face 252 of the middle step are formed so as to respectively extend to the upper inside direction and the lower inside direction from the upper ridges part 254 which are projecting out. Also, the connecting face 252 of the middle step and the engaging face 251 of the lower step are formed so as to respectively extend to the upper outside and lower outside from a lower groove part 255 which are depressed in. The engaging face 251 of the lower step and the connecting face 252 of the lower step are formed so as to respectively extend to the upper inside direction and the lower inside direction from the upper ridges part 256 which are projecting out.

Here, at each side of the rear side end face 245 and the front side end face 246, hypothetical faces S1 and S2 are assumed which are parallel to the inclined side of the planar shape of the isosceles trapezoid shape of the stair form member 240, which are also parallel to each other having predetermine distance in between, and which are perpendicular to the top face 241. When assuming such hypothetical faces, the upper ridges part 254 and the lower ridges part 256 are formed to be included in the first hypothetical face S1, and the upper groove part 253 and the lower groove part 255 are formed to be included in the second hypothetical face S2. Also, each upper and lower engaging face 251 are formed as the face having a predetermined angle α1 inclination with respect to the hypothetical faces S1 and S2, and each of upper, middle and lower connecting faces 252 can be formed as the face having a predetermined angle α2 inclination with respect to the hypothetical faces S1 and S2. The length of the height direction of each of engaging faces 251 and the connecting faces 252 are basically determined based on the space between the two hypothetical faces S1 and S2 and the inclination angle α1 and α2, but the length of the upper most and lowest faces can be a desired length.

The stair form member 240 comprising the rear side inclination face 245 and the front side end face 246 formed as such waveform engaging face is tightly held between the grips 510, 540 comprising the counter waveform engaging face having similar shape. Thereby, as discussed in below, the engaging faces 251 are pressed to the bottom direction of the jaw installing groove 123 by the counter engaging faces 521, 551 of the counter waveform engaging face of the grips 510, 540, and the stair form member 240 is moved to the down direction with respect to the grips 510, 540. Also, the entire rear side inclined face 245 and the front side end face 246 are pressed to the width direction of the jaw installing groove 123 by the grips 510, 540, and the stair form member 240 is moved to the direction of the first side face (the positioning standard side face) 243. As a result, the stair form member attached jaw 200 is highly precisely positioned to the predetermined standard position of the master jaw 120.

As shown in FIG. 7A to FIG. 7C, at the stair form member 240, the stair form member installing bolt counterbore 262 and the stair form member installing bolt penetrating hole 261 are formed at two positions. The stair form member installing bolt penetrating hole 261 and the stair form member installing bolt counterbore 262 are formed to the positions corresponding to the screw hole 221 formed at the stair installing groove 220 (see FIG. 5B) when the stair form member 240 is installed to the stair form member installing groove 220 at the bottom face 215 of the soft jaw 210 as discussed in above. Also, at the longitudinal direction of the stair form member 240, the clamping bolt penetrating hole 263 which penetrates between the rear side inclined face 245 and the front side end face 246 is formed. The clamping bolt penetrating hole 263 is a hole having a diameter allowing the shaft of the clamping bolt 273 to pass through. Therefore, the stair form member installing bolt counterbore 262 is formed at the depth so that the head part of the stair form member installing bolt 271 does not interfere with the clamping bolt 273 passing through the clamping bolt penetrating hole 263.

In the soft jaw 210 and the stair form member 240 having such constitution, the upper part of the stair form member 240 is engaged to the stair form member installing groove 220 of the soft jaw 210, and the stair form member installing bolt 271 as the connecting means is screwed to the screw hole 221 of the soft jaw 210 by passing through the stair form member installing bolt counterbore 262 and the stair form member installing bolt penetrating hole 261 from the bottom face 242 side of the stair form member 240, thereby the stair form member attached jaw 200 is integrally formed.

The grips 510, 540 shown in FIG. 8A, 8B, 9A to 9F are the member for fixing the stair form member attached jaw 200 to the master jaw 120. As shown in FIG. 10A to FIG. 12B, the rear grip 510 is placed at the inner diameter side than the stair form member 240 of the stair form member attached jaw 200 in the jaw installing groove 123 of the master jaw 120, and the front grip 540 is placed at the outer diameter side than the stair form member 240. Thereby, the stair form member 240 of the stair form member attached jaw 200 is placed between the rear grip 510 and the front grip 540 from the inner side and outer side in the diameter direction; thereby the stair form member attached jaw 200 is fixed to the predetermined position of the master jaw 120.

As shown in FIGS. 9B and 9E, the rear grip 510 and the front grip 540 are respectively a metallic member having the cross section of T shape comprising base parts 511, 541 having wide width, and a upper parts 512, 542 having narrower width than the base parts 511, 541. The base parts 511, 541 have the shape and size which can be inscribed while in contact with the bottom part 123a of the jaw installing groove 123 of the master jaw 120; and the upper parts 512, 542 have a width which contact with the upper part 123b of the jaw installing groove 123 thereof. As shown in FIGS. 9A and 9D, the planar shape of the rear grip 510 and the front grip 540 are rectangle shape wherein one side of the rectangle shape is formed as inclined sides 513, 543. The rear grip 510 is formed with the inclined face 513 which is the side at the outer diameter side when the rear grip 510 is inserted to the jaw installing groove 123 of the master jaw 120; and the front grip 540 is formed with the inclined face 543 which is the side at the inner diameter side when the rear grip 540 is inserted to the jaw installing groove 123 of the master jaw 120.

As shown in FIGS. 8A, 8B, 9C and 9F, the inclined face 513 of the rear grip 510 and the inclined face 543 of the front grip 540 are respectively formed as the counter waveform engaging face wherein the counter connecting faces 522, 552, and the counter engaging faces (the opposing engaging part) 521, 551 are repeating. The counter waveform engaging faces of the inclined face 513 of the rear grip 510 and the inclined face 543 of the front grip 540 opposes against the waveform engaging face formed at the end faces 245, 246 of the stair form member 240 of the aforementioned stair form member attached jaw 200, and also fit to the waveform engaging face.

That is, the counter waveform engaging faces of the inclined faces 512, 543 of the rear grip 510 and the front grip 540 respectively comprises the counter engaging faces 521, 551 of two steps of the upper and lower steps, and the counter connecting faces 522, 552 of three steps of the upper, middle and lower steps which connect the counter engaging faces 521, 551. The counter connecting faces 522, 552 of the upper step and the opposing engaging faces 521, 551 of the upper step extend to the upper inside and lower inside from the upper ridge parts 523, 553 which are projecting out; the counter engaging faces 521, 551 of the upper step and the counter connecting faces 522, 552 of the middle step extend to the upper outside and lower outside from the upper groove parts 524, 554 which are depressed in; the counter connecting faces 522, 552 of the middle step and the counter engaging faces 521, 551 of the lower step extend to the upper inside and lower inside from the lower ridge parts 525, 555 which are projecting out; and the counter engaging faces 521, 551 of the lower step and the counter connecting faces 522, 552 extend to the upper outside and the lower outside from the lower groove parts 526, 556 which are depressed in.

Regarding the inclined faces 513, 543 of the grips 510, 540 having such constitution, the upper ridge parts 523, 553 and the lower ridge parts 525, 555 are determined on the hypothetical face, also the upper groove parts 524 and 554 and the lower ridge parts 526 and 556 are determined on the hypothetical face, and these ridge parts and groove parts are formed; the inclination angle of each counter connecting face and counter engaging face are determined with respect to the hypothetical face and these faces can be formed; it is the same as the corresponding parts of the waveform engaging faces of the inclined faces 245, 246 of the stair form member 240. Also, the conditions such as the length in the height direction of each of these opposing connecting faces and opposing faces are the same as the corresponding parts of the waveform engaging faces of the inclined faces 245, 246 of the stair form member 240.

Note that, in between the counter waveform engaging face of the inclined faces 513, 543 of the grips 510, 540 and the waveform engaging face of the inclined faces 245, 246 of the stair form member 240, the engaging face 251 of the stair form member 240 and the counter engaging faces 521, 551 of the grips 510, 540 are parallel and the length in the height direction are the same. However, the counter engaging faces 521, 551 of the grips 510, 540 are slightly shorter than the engaging face 251 of the stair form member 240. This is because, when the stair form member 240 is tightly held between the grips 510, 540 from both sides, it can prevent the stair form member 240 from moving upwards as the ridge parts 523, 553, 525, 555 of the grips 510, 540 contact with the connecting face 252 of the stair form member 240.

Also, among the counter connecting faces 522, 552 of the counter waveform engaging face of the inclined faces 513, 543 of the grips 510, 540, the counter connecting faces 522, 552 of the middle step are formed to achieve the following condition. The condition is that the counter engaging faces 521, 551 of two steps of the upper step and lower step of the grips 510, 540 contact with the engaging face 251 of the upper and lower steps of the stair form member 240 at the same position relationships in the vertical direction (the height direction), and press each engaging face 251 of the stair form member 240. The counter connecting faces 522, 552 of the middle step of the grips 510, 540 are formed so as to correspond to the connecting face 252 of the middle step of the stair form member 240; the counter engaging faces 521, 551 of two steps of the upper and lower steps of the grips 510, 540 are formed slightly shorter than the engaging face 251 of the stair form member 240 as mentioned in the above. Therefore, in order to satisfy the above condition, the counter connecting faces 522, 552 of the middle step of the grips 510, 540 have slightly different inclination angle and the length in the height direction compared to the connecting face 252 of the middle step of the stair form member 240.

The counter connecting faces 522, 552 of the upper most step of the grips 510, 540 are parallel with the counter connecting faces 522, 552 of the middle step of the aforementioned grips 510, 540, and formed slightly shorter than the connecting face 252 of the upper most step of the stair form member 240. Also, the counter connecting faces 522, 552 of the lowest step of the grips 510, 540 are parallel with the counter connecting faces 522, 552 of the middle step of the aforementioned grips 510, 540, and formed longer than the connecting face 252 of the lowest step of the stair form member 240. The difference in the length of the counter connecting faces 522, 552 of the upper most step and the lowest step is longer than the length of the stair form member pulled down when tightly holding the stair form member 240 between the grips 510, 540, and also it is about the length which is pulled down.

As shown in FIG. 9A to 9F, the grips 510, 540 are formed with the clamping bolt holes 530, 560 penetrating through the grips 510, 540 in the extending direction of the jaw installing groove 123 when the grips 510, 540 are inserted into the jaw installing groove 123 of the master jaw 120. The clamping bolt hole 530 of the rear grip 510 is a screw hole formed with the screw groove of which a screw part of the tip of the clamping bolt 273 is screwed. Also, at the side of the outer diameter side end face 544 of the front grip 540, the counterbore 561 is formed where the head part of the clamping bolt 273 is housed. The clamping bolt holes 530, 560 of the grips 510, 540, and the clamping bolt penetrating hole 263 of the stair form member 240 of the stair form member attached jaw 200 are placed on the same axis so that the clamping bolt 273 can be inserted when the clamping bolt holes 530, 560 and the clamping bolt penetrating hole 263 are provided to the jaw installing groove 123 of the master jaw 120.

For the grips 510, 540, the base parts 511, 541 are wider than the upper parts 512, 542; hence the step faces 515, 545 facing upwards are formed between the base parts 511, 541 and the upper parts 512, 542. These step faces 515, 545 contacts with the shoulder part 123c of the jaw installing groove 123 of the master jaw 120, and will be the standard face (this corresponds to the locking part in Claims) when pulling the stair form member attached jaw 200 downwards while supported by the shoulder part (the supporting face for pulling down) 123c of the jaw installing groove 123.

Figure 10B:
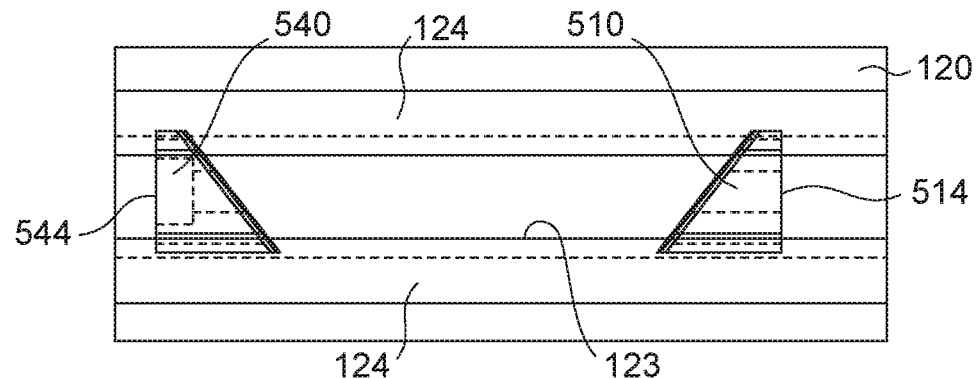
FIG. 10A and FIG. 10B are the first diagrams for describing the step of providing the stair form member attached jaw to the master jaw.
Figure 10A:
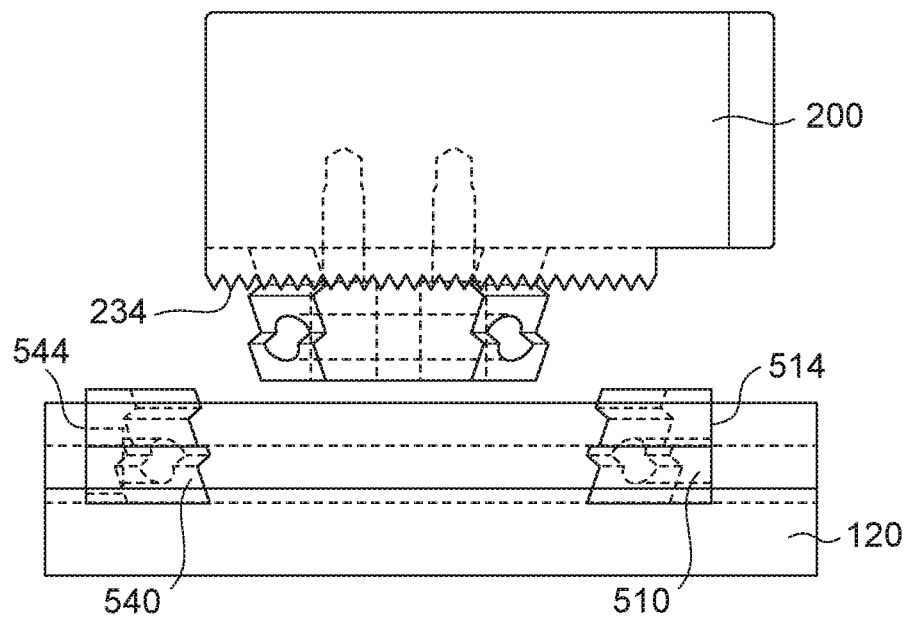

Next, the method for processing the workpiece will be discussed using the lathe 1 comprising the chuck mechanism 10 having such constitution. First, as shown in FIGS. 10A and 10B, the grips 510, 540 are inserted into the jaw installing groove 123 of the master jaw 120. That is, the rear grip 510 is inserted into the jaw installing groove 123 so that the inner diameter side end face 514 is facing the inner diameter side, and then the front grip 540 is inserted into the jaw installing groove 123 so that the outer side end face 544 is facing the outer diameter side.

Figure 11B:
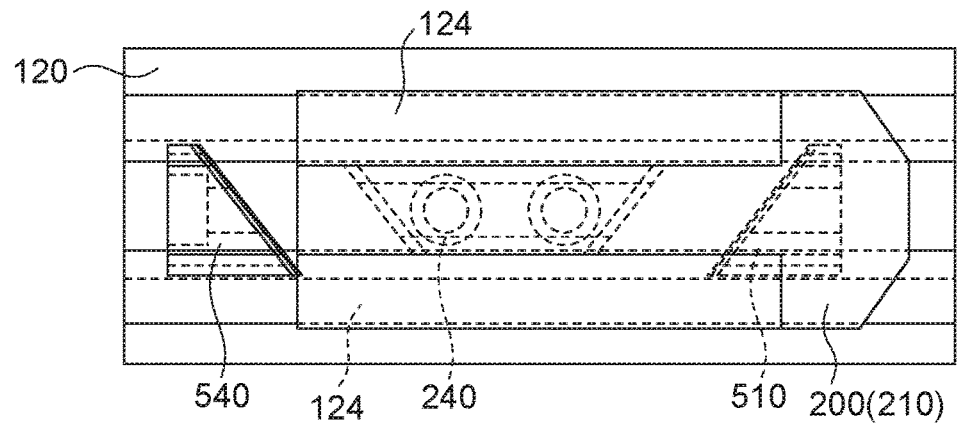
FIG. 11A and FIG. 11B are the second diagrams for describing the step of providing the stair form member attached jaw to the master jaw.
Figure 11A:
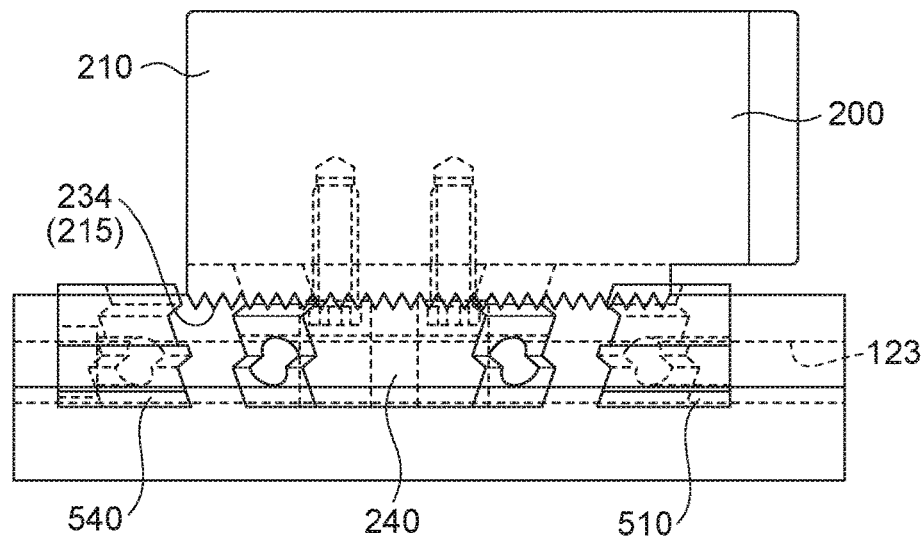

Next, as shown in FIGS. 11A and 11B, the stair form member attached jaw 200 is provided to the master jaw 120. That is, the stair form member attached jaw 200 is moved to the direction of the jaw installing groove 123 of the master jaw 120 from the upper side of the jaw installing groove 123 of the master jaw 120 to insert the stair form member 240 to the jaw installing groove 123, and the soft jaw 210 is brought into contact with the master jaw 120. Here, the serration of the serration face 234 of the bottom face 215 of the soft jaw 210 of the stair form member attached jaw 200 and the serration of the serration face 124 of the master jaw 120 are engaged at the predetermined position. Therefore, the stair form member attached jaw 200 is placed at the approximately predetermined position on the master jaw 120 in the radial direction.

Figure 12B:
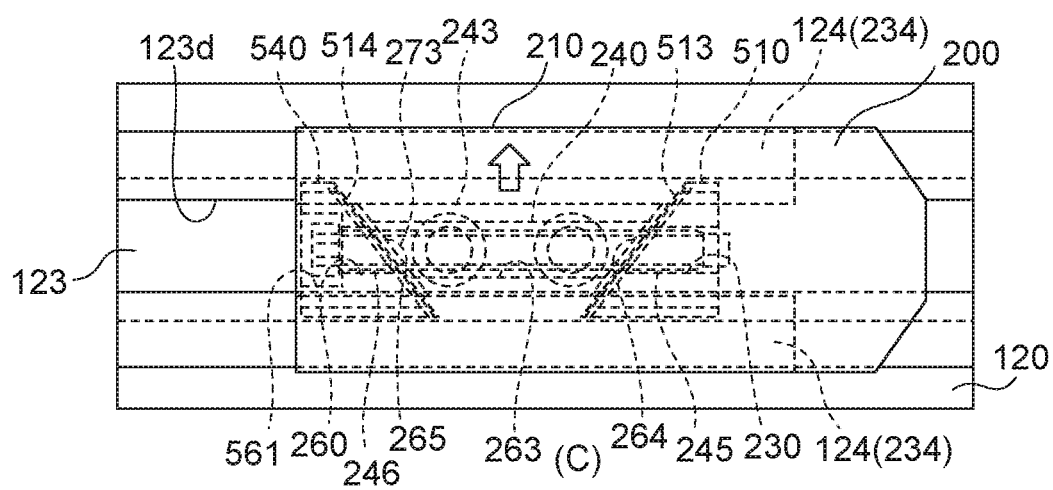
FIG. 12A and FIG. 12B are the third diagrams for describing the step of providing the stair form member attached jaw to the master jaw.
Figure 12A:
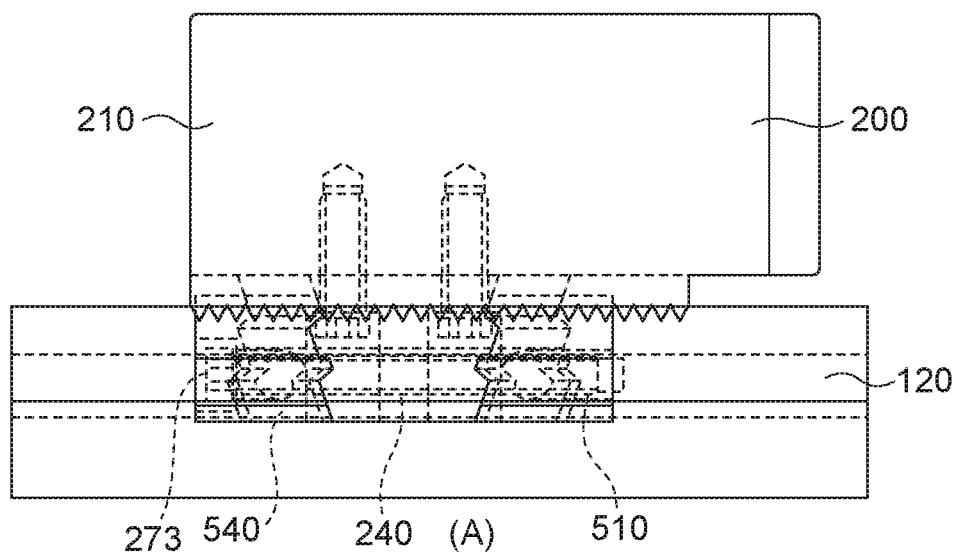

Once the stair form member 240 of the stair form member attached jaw 200 is inserted to the jaw installing groove 123, the clamping bolt 273 is inserted from the end part of the master jaw 120 of the outer circumference face of the chuck main body 110. The clamping bolt 273 is inserted to the clamping bolt hole 560 from the part of the clamping bolt counterbore 561 of the outer diameter side end face 544 of the front grip 540, and as shown in FIGS. 12A and 12B, the clamping bolt penetrates through the clamping bolt penetrating hole 263 from the front side end face 246 to the rear side end face 245 of the stair form member 240, thereby the clamping bolt 273 is screwed to the clamping bolt hole 530 of the rear grip 510 formed with the screw hole.

The position of the soft jaw 210 is determined highly precisely by tightening the clamping bolt 273 while in this condition. This will be explained by referring to FIG. 13A to 13C.

FIG. 13A to 13C are the figures schematically showing the master jaw 120, the stair form member 240 of the stair form member attached jaw 200, the rear grip 510, and the front grip 540. Also, FIG. 13A to FIG. 13C are the figures schematically showing the positional relationship and the condition of the shoulder part (the supporting face for pulling down) 123c at the boundary between the bottom part 123a and the upper part 123b of the jaw installing groove 123 of the master jaw 120; the waveform engaging face of the rear side end face 245 and the front side end face 246 of the stair form member 240, the counter waveform engaging face of the inclined faces 513, 543 of the rear grip 510 and the front grip 540; and the step faces (the standard faces for pulling down) 515, 545 between the base parts 511, 541 and the upper parts 512, 542 of the rear grip 510 and the front grip 540.

FIG. 13A is the figure showing the condition wherein the rear grip 510 and the front grip 540 are inserted in the jaw installing groove 123 of the master jaw 120 while taking enough space, and inserting the stair form member 240 of the stair form member attached jaw 200 to the space. Under this condition, the rear grip 510 and the front grip 540 are housed in the jaw installing groove 123 roughly in a perfect fit manner; and the stair form member 240 is placed and it is slightly shifted up because it is simply placed on the upper part of the master jaw 120.

While in this condition, the clamping bolt 273 is inserted to the front grip 540, the stair form member 240 and the rear grip 510, and the stair form member 240 is tightened from the both sides; thereby as shown in FIG. 13B, the space between the rear grip 510 and the front grip 540 becomes narrower and the waveform engaging face of the rear side end face 245 of the stair form member 240 and the counter waveform engaging face of the inclined face 513 of the rear grip 510 engages. Also, the waveform engaging face of the front side end face 246 of the stair form member 240 and the counter waveform engaging face of the inclined face 543 of the front grip 540 engages. Specifically, the waveform engaging face of the stair form member 240 is placed slightly higher, hence first the ridge parts 523, 553, 525, 555 of the grips 510, 540 are contacted with the engaging face 251 of the waveform engaging face of the end faces 245, 246 of the stair form member 240.

If the clamping bolt 273 is further tightened while in this condition, the space between the rear grip 510 and the front grip 540 becomes smaller, and the ridge parts 523, 553, 525, 555 of the grips 510, 540 slides on the engaging face 251 of the waveform engaging face of the end faces 245, 246 of the stair form member 240. That is, the ridge parts 523, 553, 525, 555 of the grips 510, 540 move to the upward direction relatively along the engaging face 251 of the waveform engaging face of the end faces 245, 246 of the stair form member 240. Here, for the grips 510, 540, the step faces (the standard faces for pulling down) 515, 545 are in close contact with the shoulder part (the supporting face for pulling down) 123c of the master jaw 120, and cannot make upward movement; therefore as shown in FIG. 13C, the stair form member 240 moves relatively only for distance "d", thus the stair form member 240 is pulled down for the length "d". Further, as shown in FIG. 13C, the waveform engaging face of the end faces 245, 246 of the stair form member 240 and the counter waveform engaging face of the inclined faces 513, 514 of the grips 510, 540 are engaged, thereby the tightening of the clamping bolt is completed.

As discussed in above, the serration is formed at the serration face 124 of the both sides of the jaw installing groove 123 of the master jaw 120, and the serration is formed at the serration face 234 of the bottom face of the stair form member attached jaw 200. These serrations are engaged while the stair form member attached jaw 200 is mounted on the master jaw 120 along the jaw installing groove 123. While under such condition, if the stair form member 240 between the grips 510, 540 is tightened by the clamping bolt 273, then the soft jaw 210 is pulled down as discussed in above, and each serration of the serration face 124 of the master jaw 120 and of the serration face 234 of the stair form member attached jaw 200 are engaged at the position where saw teeth 124a, 234a are at deepest and most stable position. As a result, the position in the radial direction of the stair form member attached jaw 200, in other words, the position in the radial direction of the soft jaw 210 are determined precisely to a desired positioned.

Also, the stair form member 240 of the stair form member attached jaw 200 is tightened from the both sides in the radial direction by the grips 510, 540 comprising the inclined faces 513, 543 which correspond to the inclined faces 245, 246. As a result, the stair form member 240 is moved to the direction of the first side face 243 because the force to the width direction as shown by the arrow of FIG. 12B acts. As discussed in above, each serration of the serration face 124 of the master jaw 120 and of the serration face 234 of the soft jaw 210 are formed with the saw teeth 124a, 234a in a width direction, thus even if these serration faces are engaged with each other, the master jaw 120 and the stair form member attached jaw 200 can move in a width direction. Therefore, the stair form member 240 moves until the first side face 243 tightly contacts with the stair form member position defining face 123d of the jaw installing groove 123 of the master jaw 120, and the position in the width direction thereof is highly precisely determined to the position where the positioning standard side face 243 tightly contacts with the stair form member positioning face 123d of the master jaw 120.

Note that, regarding the clamping of the stair form member attached jaw 200 according to such method, the ridge parts 523, 525, 553, 555 of the grips 510, 540 slide the engaging face 251 of the stair form member 240, thus the ridge parts 523, 525, 553, 555 of the grips 510, 540 clamp while self-cleaning the engaging face 251 of the stair form member 240. As a result, the foreign matter is prevented from entering into the clamping face, and allows clamping in a clean state.

Also, as mentioned in above, the counter engaging faces 521, 551 of the grips 510, 540 are formed slightly shorter than the engaging face 251 of the stair form member 240, thus even if the waveform engaging face of the stair form member 240 and the counter waveform engaging face of the grips 510, 540 are engaged, the ridge parts 523, 525, 553, 555 of the grips 510, 540 do not reach the groove parts 253, 255 of the stair form member 240. That is, even if the stair form member 240 and the grips 510, 540 are engaged, at least the lower part between the connecting face 252 of the stair form member 240 and the counter connecting faces 522, 552 of the grips 510, 540 do not contact with each other, and has a space in between them. Therefore, due to the self-cleaning which has been mentioned in the above, even if the foreign matters exist on the clamping face, the foreign matters will be held at the space between the connecting face 252 of the stair form member 240 and the counter connecting faces 522, 552 of the grips 510, 540. As a result, the foreign matters or so can be prevented from entering into other parts, and also the foreign matters can be prevented from making a scar on the clamping face of the stair form member 240 and the grips 510, 540.

In the chuck mechanism 10 of the present embodiment, by tightening one clamping bolt 273, the stair form member 240 of the stair form member attached jaw 200 is held between the rear grip 510 and the front grip 540, and the position of the soft jaw 210 is determined precisely in both directions of the radial direction and the tangent line direction of the end face 112 of the chuck main body 110. Thus, by respectively providing the stair form member attached jaw 200 to three master jaws 120, three soft jaws 210 are provided on the end face 112 of the chuck main body 110.

Once the soft jaw 210 is provided, the chuck main body 110 is rotated by driving the lathe 1 for grinding to grind the tip of the soft jaw 210, thereby a desired workpiece holding face is formed at the workpiece holding part 211 of the soft jaw 210. Thereby, the center of the curvature of the holding face perfectly matches with the rotational axis of the chuck main body 110, and the holding face is centered with respect to the chuck main body 110. After forming the holding face to the workpiece holding part 211 of the soft jaw 210, the workpiece is placed at the inside of the holding face of the soft jaw 210 to hold the workpiece by the holding face of the workpiece holding part 211 of the soft jaw 210, then after centering the workpiece as discussed in above, the lathe 1 is driven to rotate the chuck main body 110 to which the workpiece is fixed, thereby the workpiece is ground.

As such, the chuck mechanism 10 of the present embodiment has a constitution which provides the stair form member attached jaw 200 to the master jaw 120 using the grips 510, 540, thus in order to provide one jaw, one clamping bolt 273 is tightened, and in order to provide three jaws, three clamping bolts 273 may be tightened. Also, when changing the jaw by removing from the chuck mechanism 10, for example when changing the workpiece (during changeover processing step) or so, three clamping bolts 273 of the three stair form member attached jaws 200 are loosen to remove, then three clamping bolts 273 may be tightened, thus total of six clamping bolts 273 may be removed and installed. On the contrary to this, the conventional jaws used two installing bolts for each jaw, thus in order to provide one jaw, two bolts need to be tightened, hence in order to provide three jaws, six bolts need to be tightened, therefore in order to change the jaws, total of twelve installing bolts need to be loosened and tightened, which requires double the work of the chuck mechanism 10 of the present invention. Therefore, according to the chuck mechanism 10 of the present embodiment, efficient and fast change of jaw and workpiece can be done, and the desired processing can be done extremely efficiently.

Also, the jaw (soft jaw 210) of the present invention are integrally assembled with the stair form member 240 by inserting the stair form member installing bolt 271 thereto from the lower direction, and there is no hole or counterbore formed at the top face for the bolt. That is, the soft jaw 210 of the present invention can be formed to have a flat face except for the bottom face. As a result, when carrying out the grinding or so, the cutting scraps can be prevented from cumulating in the counterbore for the bolt of the jaw or so. Such grinding scraps may make a scratch or so to the surface of the workpiece when carrying out the grinding or so, which could compromise the processing. However, the jaw of the present invention do not have a depression or projection of which such cutting scraps can cumulate, and the cutting scraps generated from the processing are blown away by a centrifugal force and are removed from the surrounding. Therefore, high precision processing can be done with little defective products.

Also, in the chuck mechanism 10 of the present embodiment, the stair form member attached jaw 200 is pulled down by the waveform engaging face of the stair form member 240 and the counter waveform engaging face of the grips 510, 540, thus the serration of the serration face 124 of the master jaw 120 and the serration of the serration face 234 of the soft jaw 210 are securely engaged. As a result, the position in the radial direction of the stair form member attached jaw 200 is determined with a high precision. Also, for the chuck mechanism 10 of the present embodiment, the stair form member 240 is fixed by the stair form member 240 having a planar shape of isosceles trapezoid shape and by the grips 510, 540 having a planar shape of a trapezoid shape; thus the positioning standard side face 243 of the stair form member 240 securely and tightly contacted with the stair form member position defining face 123d of the jaw installing groove 123 of the master jaw 120. As a result, the position in the tangent line direction of the stair form member attached jaw 200 is determined with high precision.

As such, the position of the soft jaw 210 in the radial direction and the tangent line direction can be determined easily and highly precisely, the installing and positioning of the jaw can be carried efficiently and accurately even by a person with less experience, and also in case of providing the jaw to the chuck mechanism 10 of the lathe 1 after removing it. As a result, the holding and centering of the workpiece can be done efficiently and accurately, thus the workpiece can be processed efficiently and promptly. Particularly, in case of efficiently processing the workpiece of different type having different processing diameter and processing shape such as high-mix low volume production, it is preferable to efficiently and accurately change the jaw, hence the present invention is extremely effective.

Second Embodiment

The second embodiment of the present invention will be explained by referring mainly to FIG. 14 to 17B. Regarding the lathe 2 of the second embodiment 2 (see FIG. 1), the structure of the master jaw, the stair form member attached jaw and the grip of the chuck mechanism 20 are different form the chuck mechanism 10 of the lathe 1 of the first embodiment.

Figure 14:
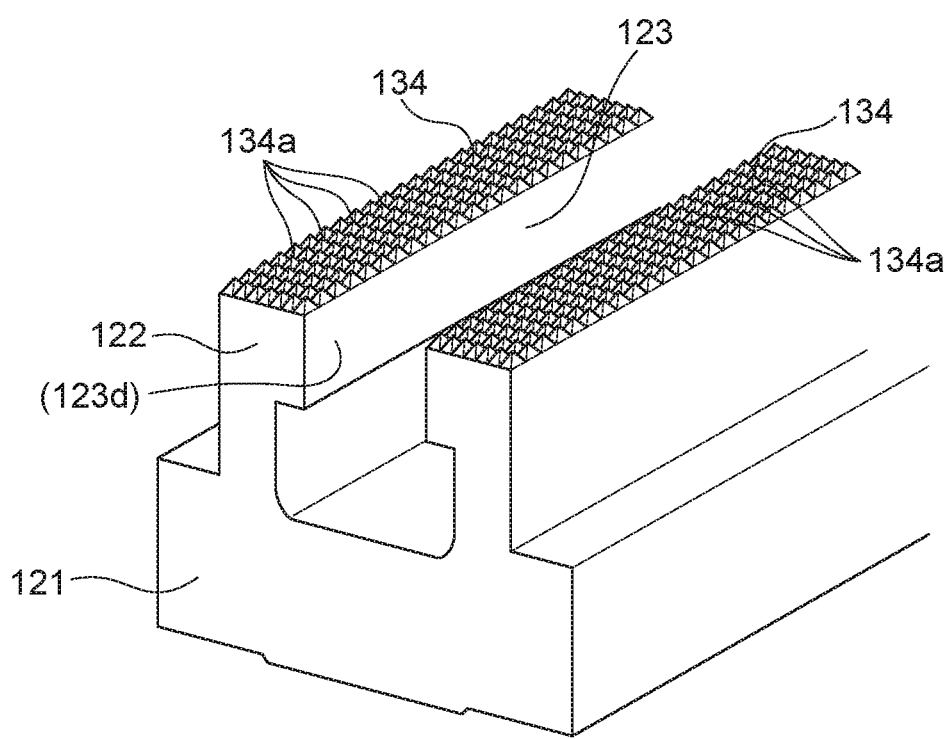
FIG. 14 is the perspective view of the master jaw of the second embodiment of the present invention.

As shown in FIG. 14, the master jaw 130 has a different constitution of the serration face 134 at both sides of the jaw installing groove 123 compared to the master jaw 120 of the first embodiment. As shown in FIG. 14, the serration formed on the serration face 134 of the master jaw 130 has a structure wherein many spikes 134a having a tetragonal pyramid are aligned. Each spike 134a has approximately a triangular cross section shape, and each spike 134a comprises a tip part which has been chamfered, and four inclined faces inclining from the tip part.

The spike 134a is aligned along the extending direction of the jaw installing groove 123 of the master jaw 130 and also in the perpendicular direction to the extending direction at predetermined pitch. The pitch of the spikes 134a in the present embodiment is 3 mm for both in the extending direction of the jaw installing groove 123 and in the perpendicular direction thereto. However, it is not limited thereto, and for example it may be any length such as 1.5 mm or so. The spikes 134a having such lattice form are formed by forming plurality of saw teeth extending along the extending direction of the jaw installing groove 123 and arranged in a predetermined pitch, and also by forming plurality of saw teeth extending along a perpendicular direction thereto and arranged in a predetermined pitch, to the same area (the serration face 134a) by using the serration cutter or so.

Note that, for the master jaw 130 of the second embodiment, as discussed in below, the serration of the serration face 134 of the master jaw 130 and the serration formed at the soft jaw 310 of the stair form member attached jaw 300 are engaged, thereby the position in the width direction of the stair form member attached jaw 300 is determined. Therefore, as in case of the master jaw 120 of the first embodiment, the function as the stair form member position defining face is not necessary for either one of the side faces 123d of the jaw installing groove 123.

Figure 15A:
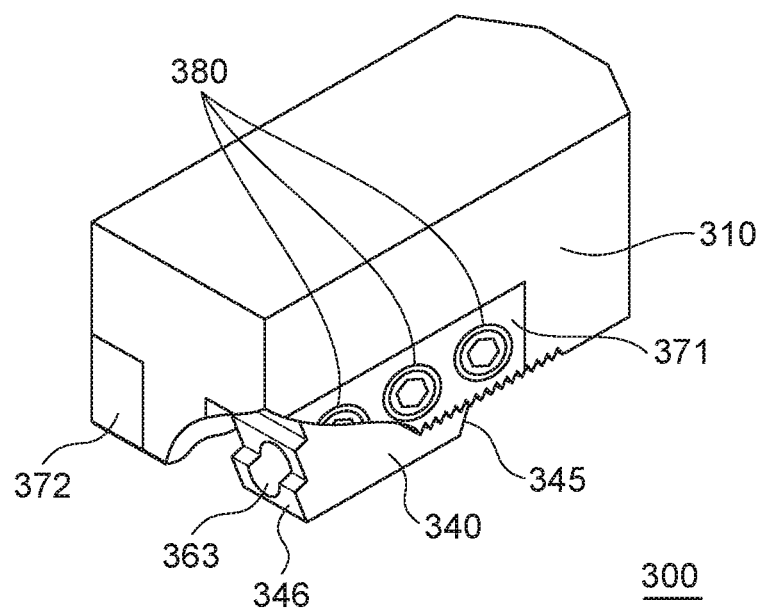
FIG. 15A to FIG. 15C are the diagrams showing the structure of the stair form member attached jaw of the second embodiment.
Figures 15B, 15C:
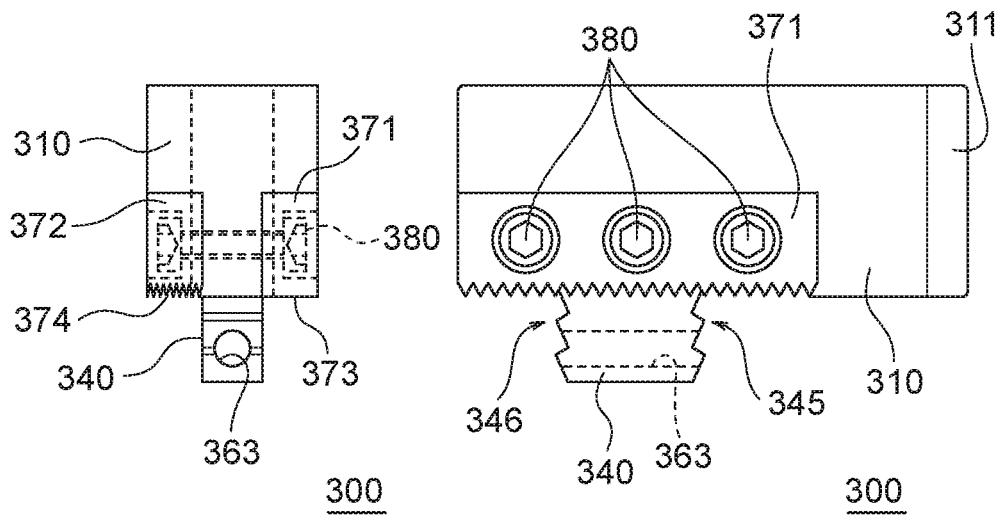
Figure 16A:
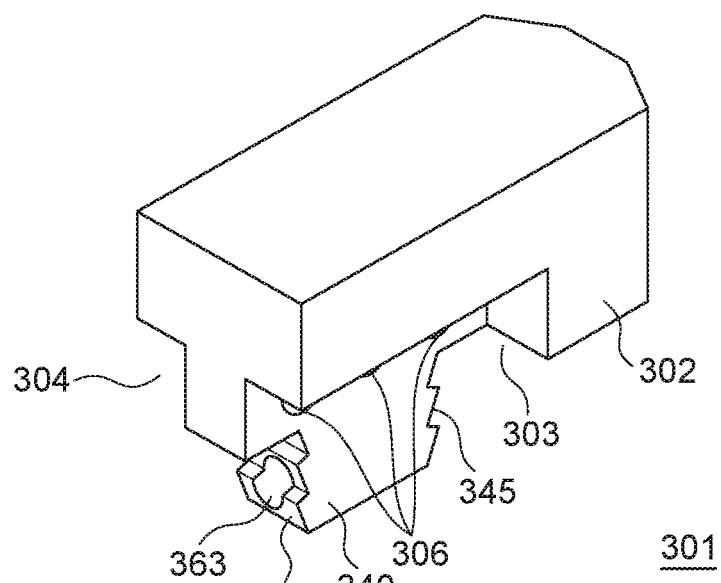
FIG. 16A to FIG. 16E are the diagrams showing the structure of each part of the stair form member attached jaw shown in FIG. 15.

The stair form member attached jaw 300 has different constitution of the parts forming the stair form member attached jaw 300, and also different shape of serration of the serration faces 373 and 374 compared to the stair form member attached jaw 200 of the first embodiment. The stair form member attached jaw 300 of the second embodiment shown in FIG. 15 is formed by assembling the stair form member attached jaw main body 301 shown in FIG. 16A with a bilateral serration piece 371 and a vertical serration piece 372 shown in FIGS. 16B and 16D using the serration piece installing bolt 380. That is, in the stair form member attached jaw 300, two serration pieces 371 and 372 are separated from the soft jaw 310 and form separate member, the rest of the jaw main body 302 and the stair form member 340 are integrally formed as the stair form member attached jaw main body 301 as shown in FIG. 16A. Note that, the stair form member attached jaw 200 of the first embodiment is referred as "an assembled type jaw", the stair form member attached jaw 300 of the second embodiment is referred as "an integrated jaw" or "a stair form member integrated type jaw" because the jaw main body 302 and the stair form member 340 are integrally formed as the stair form member attached jaw main body 301.

The jaw main body 302 of the stair form member attached jaw main body 301 is formed with notches 303, 304 which correspond to the form of the serration pieces 371, 372 at the lower part of the both side faces in the width direction of the soft jaw 310. In other words, the jaw main body 302 is the part excluding the part corresponding to the serration pieces 371, 372 from the soft jaw 310.

The stair form member 240 of the stair form member attached jaw 200 of the first embodiment has a planar shape of isosceles trapezoid shape (see FIG. 6), on the contrary the stair form member 340 of the stair form member attached jaw main body 301 has a planar shape of rectangular parallelepiped shape. Therefore, the rear side end face 245 and the front side end face 246 of the stair form member 240 of the first embodiment were the inclined faces, but the rear side end face 345 and the front side end face 346 of the stair form member 340 of the second embodiment are the faces parallel with the width direction of the soft jaw 310. The rear side end face 345 and the front side end face 346 of the stair form member 340 are respectively formed as similar to the wave form engaging faces of the rear side end face 245 and the front side end face 246 of the stair form member 240 of the first embodiment. Also, the stair form member 340 is formed with the clamping bolt penetrating hole 363 for passing through the clamping bolt so that it penetrates between the rear side end face 345 and the front side end face 346.

Figure 16D:
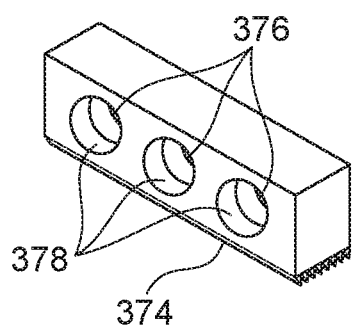
Figure 16B:
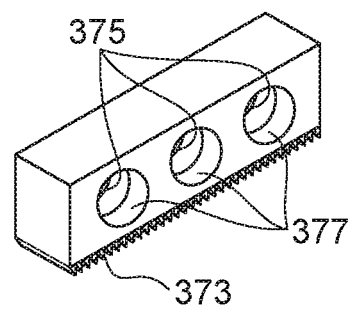
Figure 16E:
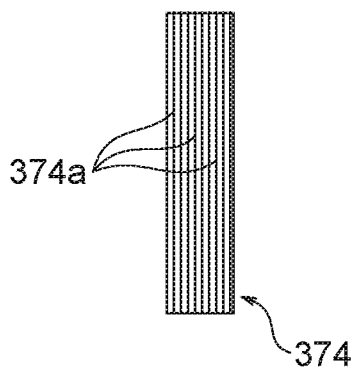
Figure 16C:
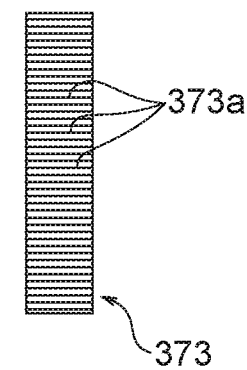

As shown in FIG. 16B, the bilateral serration piece 371 of the stair form member attached jaw 300 is the metallic member having a rectangular parallelepiped shape. At the bilateral serration piece 371, the bolt penetrating hole 375 is formed which penetrates between the both side faces along the width direction. Around the bolt penetrating hole 375 of one of the side face of the bilateral serration piece 371, the counterbore 377 which houses the head part of the serration piece installing bolt 380 is formed. As shown in FIG. 16C, at the bottom face of the bilateral serration piece 371, the serration face 373 formed with the saw teeth 373a extending in the short direction (the width direction) of the bilateral serration piece 371 is formed. The serration of the serration face 373 is the same as the serration of the serration face 234 of the soft jaw 210 of the first embodiment; and many saw teeth 373a having a regular triangle cross section extending along the width direction are aligned in a predetermined pitch to the longitudinal direction (the direction which is perpendicular against the extending direction of the saw tooth 373a) of the soft jaw 310. Note that, in the present embodiment, the pitch of the saw teeth 373a is 3 mm.

As shown in FIG. 16D, the vertical serration piece 372 is the metallic member of the rectangular parallelepiped shape having about the same size as the bilateral serration piece 371, and also formed with the bolt penetrating hole 376 penetrating between the both side faces along the width direction. Also, around the bolt penetrating hole 376 of one of side faces, the counterbore 378 housing a nut where the serration piece installing bolt 380 is formed. As shown in FIG. 16E, the bottom face of the vertical serration piece 372 is formed at the serration face 374 formed with the saw teeth 374a extending along the longitudinal direction of the vertical serration piece 372. The serration of the serration face 374 has many saw teeth 374a having a regular triangle cross section shape and extending along the longitudinal direction of the soft jaw 310, and aligned in a predetermined pitch along the width direction of the soft jaw 310 (the perpendicular direction against the extending direction of the saw teeth 373a). That is, the serration of the serration face 374 is a different serration because the saw teeth 374a is extending in a 90° different direction compared to the serration of the serration face 234 of the first embodiment or the serration of the serration face 373. Note that, in the present embodiment, the pitch of the saw teeth 373a is 3 mm.

The bilateral serration piece 371 and the vertical serration piece 372 having such constitution are respectively placed to the serration piece notches 303, 304 of the stair form member attached main body 301 shown in FIG. 16A, and three serration piece installing bolts 380 (see FIG. 15) penetrating each of the bolt penetrating holes 375, 376 of the serration pieces 371, 372, and the bolt penetrating hole 306 of the stair form member attached jaw main body 301 are provided, then these are tightened by the nut not shown in the figure. As a result, the stair form member attached jaw 300 shown in FIG. 15A to FIG. 15C is formed.

As similar to the rear grip 510 of the first embodiment, the grips 610, 640 are the member to fix the stair form member attached jaw 300 to the master jaw 130. For the grips 510, 540 of the first embodiment, the planar shape of the stair form member 240 which is to be held has an isosceles trapezoid shape and the end faces 245, 246 are inclined faces (see FIG. 6), thus the end faces 513, 543 of the grips 510, 540 are also inclined faces (see FIGS. 8A and 8B). However, the stair form member 340 of the second embodiment has a planar shape of a rectangular parallelepiped shape as already mentioned, therefore the planar shape of the grips 610, 640 are also rectangular parallelepiped shape. That is, for the rear grip 610, the holding end face 613 which is the outer diameter side when the rear grip 610 is inserted to the jaw installing groove 123 of the master jaw 130 is the face parallel to the width direction of the jaw installing groove 123. For the front grip 640, the holding end face 643 which is the inner diameter side when the front grip 640 is inserted to the jaw installing groove 123 of the master jaw 130 is the face parallel to the width direction of the jaw installing groove 123.

The grips 610, 640 are the same as the grips 510, 540 of the first embodiment because these are the metallic member having a cross section of T-shape; these contact with and housed to the jaw installing groove 123 of the master jaw 130; the step face at the boundary between the base parts 611, 641 and the upper parts 612, 642 are the standard face when pulling down the stair form member attached jaw 300; and has same constitution of the clamping bolt holes 630, 660 and the counter bore 661. Also, each of the holding end faces 613, 643 of the grips 610, 640 are formed in the counter waveform engaging face as similar to the inclined faces 513, 543 of the grips 510, 540 of the first embodiment. The counter waveform engaging faces of the holding end faces 613, 643 of the grips 610, 640 are the face which fit to the waveform engaging face formed to the end faces 345, 346 of the stair form member 340 of the aforementioned stair form member attached jaw 300. For the stair form member attached jaw 300, the stair form member 340 is held and tightened by the grips 610, 640 having such constitution, and the master jaw 130 is provided to the predetermined position.

The method of processing the workpiece using the lathe 2 comprising the chuck mechanism 20 of the second embodiment of such constitution is also basically the same as the lathe 1 of the first embodiment. That is, the rear grip 610 and the front grip 640 are inserted in this order to the jaw installing groove 123 of the master jaw 130, then the stair form member attached jaw 300 is placed at the predetermined position on the master jaw 130 so that the stair form member 340 is between the rear grip 610 and the front grip 640. Then, the clamping bolt is inserted and tightened to the clamping bolt penetrating holes 660, 363, 630 of the front grip 640, the stair form member 340, and the rear grip 610. Thereby, the stair form member 340 is held between the grips 610, 640, and the stair form member attached jaw 300 is provided precisely to the predetermined position of the master jaw 130.

The stair form member attached jaw 300 comprises at the bottom face of the soft jaw 310 the serration face 373 formed with the serration in the short direction of the soft jaw 310, and the serration face 374 formed with the serration in the longitudinal direction of the soft jaw 310. If the stair form member attached jaw 300 is provided to the master jaw 130, these serration faces 373, 374 both engages with the spikes 134a of the master jaw 130. Therefore, for the stair form member attached jaw 300, just by placing the soft jaw 310 on the master jaw 130, the position in both of the width direction and the longitudinal direction of the soft jaw 310 can be done. Then, by placing the stair form member 340 between the grips 610, 640, the stair form member 340 is pulled down as discussed in above by referring to FIG. 13, and the serration faces 373, 374 of the soft jaw 310, and the spikes 134a of the master jaw 130 engages at the deep and stable position. As a result, the position of the width direction and the longitudinal direction (the radial direction) of the stair form member attached jaw 300 is determined accurately at the desired position.

As such, once the three master jaws 130 are respectively provided with the stair form member attached jaw 300, then as similar to the first embodiment, the tip of the soft jaw 310 is ground to form the holding face of the workpiece at the workpiece holding part 311 of the soft jaw 310. Then, the workpiece is held at the holding face of the workpiece holding part 311 of the soft jaw 310, and then the lathe 2 is driven to carry out the desired grinding to the workpiece.

Regarding the stair form member attached jaw 200 of the first embodiment, the planar shape of the stair form member 240 is the isosceles trapezoid shape, thus the stair form member 240 is moved towards the positioning standard side face 243 by tightening the stair form member 240 by the grips 510, 540, thereby the position in the width direction of the stair form member attached jaw 200 is done. On the other hand, regarding the stair form member attached jaw 300 of the second embodiment, the planar shape of the stair form member 340 is the rectangular parallelepiped shape, thus even if the stair form member 340 is tightened by the grips 610, 640, the force in the width direction does not act. However, the serration face 373 of the width direction and the serration face 374 of the longitudinal direction are formed at the bottom face of the soft jaw 310, and these engages with the spikes 134a of the top face of the master jaw 130, thereby the stair form member attached jaw 300 is positioned highly precisely in the width direction and the longitudinal direction. The present invention can be carried out by such embodiment as well.

Further, for the chuck mechanism 20 of the second embodiment having such constitution, the soft jaw 310 is provided by tightening one clamping bolt for one jaw; and for providing three jaws, three clamping bolts may be tightened. Therefore, when changing the jaw by removing it from the chuck mechanism 20, for three stair form member attached jaws 300, three clamping bolts are removed and three clamping bolts are tightened, thus total of six clamping bolts are removed and installed. That is, as similar to the case of the first embodiment, the jaw and the workpiece can be changed by half of the conventional process, and the desired processing can be done extremely efficiently.

Also, regarding the chuck mechanism 20 of the second embodiment, due to the constitution of the waveform engaging face of the end faces 345, 346 of the stair form member 340, and the counter waveform engaging face of the holding side end faces 613, 643 of the grips 610, 640, the stair form member attached jaw 300 is pulled down, thus the serration of the serration face 134 of the master jaw 130 and the serration of the serration faces 373, 374 of the soft jaw 310 can be securely engaged. As a result, the position in the longitudinal direction (the radial direction of the end face 112 of the chuck main body 110) and the width direction of the stair form member attached jaw 300 can be determined highly precisely.

Thus, the position in the radial direction and the tangent line direction of the soft jaw 310 can be easily and highly precisely determined, therefore the jaw can be provided and positioned efficiently and accurately even by a person with less experience, and even in case of removing the jaw from the chuck mechanism 20 of the lathe 1 and providing it again. As a result, the centering and holding of the workpiece can be done efficiently and accurately, thus the workpiece can be processed quickly and highly precisely.

Note that, the chuck mechanism 20 of the second embodiment is significantly different from that of the first embodiment from the point that the stair form member 340 has a planar shape of rectangular parallelepiped shape, and the serration is formed in vertical and bilateral directions of the soft jaw 310, also the structure of the stair form member 300 has the stair form member attached jaw main body which the stair form member 340 and the jaw main body 302 are integrally formed. These two differences were discussed as one embodiment for the purpose to explain, and these do not necessarily have to be applied simultaneously, and may be applied separately. That is, the constitution of master jaw, the stair form member, and the grip or so of the first embodiment using the stair form member having a planar shape of isosceles trapezoid shape, and the structure of integrally formed jaw of the second embodiment wherein the serration piece is assembled to the stair form member attached jaw main body of which the jaw main body and the stair form member are integrally formed, may be applied together. Also, the constitution of the master jaw, the stair form member, and the grip or so of the second embodiment using the stair form member having a planar shape of rectangular parallelepiped shape, and the structure of the stair form member attached jaw of the assembling type of the first embodiment of which the stair form member is provided to the bottom face of the soft jaw by the bolt can be applied together.

Third Embodiment

Figure 18A:
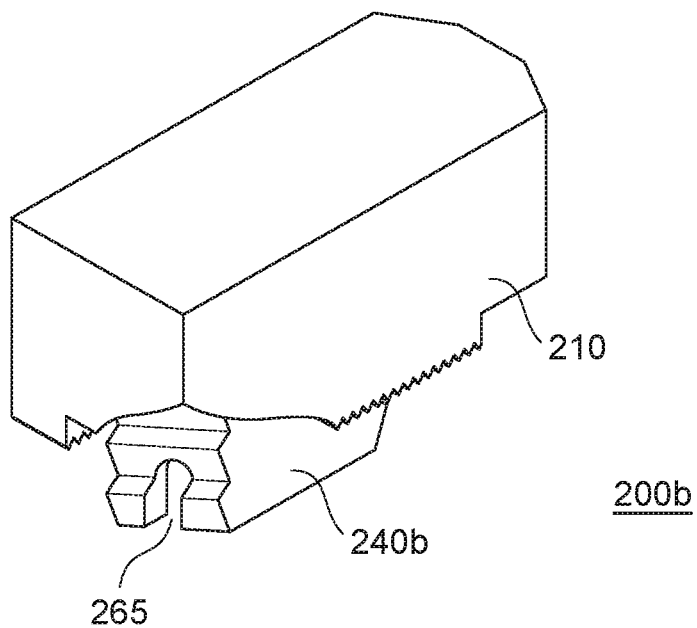
FIG. 18A and FIG. 18B are the diagrams showing the constitution of the stair form member attached jaw of the third embodiment of the present invention.
Figure 18B:
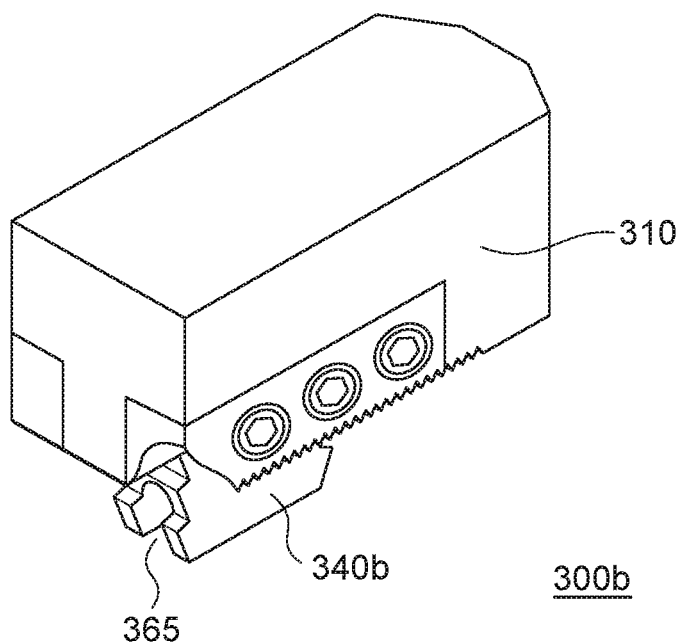

The third embodiment of the present invention will be described by referring to FIG. 18A to 19C. As shown in FIGS. 18A and 18B, the stair form member attached jaws 200b and 300b of the third embodiment are formed with a U-shaped groove having an open lower side at the stair form members 240b and 340b in place of the clamping bolt penetrating holes. Note that, in comparison to the stair form member attached jaw 200 of the first embodiment, FIG. 18A shows the stair form member attached jaw 200b of the third embodiment wherein the clamping bolt penetrating U-shaped groove is formed to the stair form member 240; and in comparison to the stair form member attached jaw 300 of the second embodiment, FIG. 18B shows the stair form member attached jaw 300b of the third embodiment wherein the clamping bolt penetrating U-shaped groove 365 is formed to the stair form member 340.

The stair form member attached jaws 200, 300 of the aforementioned first and second embodiment have the constitution wherein the clamping bolt 273 passes through the clamping bolt penetrating holes 263, 363 formed at the stair form members 240, 340; thereby the stair form members 240, 340 are held between the rear grips 510, 610 and the front grips 540, 640. Therefore, as shown in FIGS. 11A and 11B, the stair form members 240, 340 (the stair form member attached jaws 200, 300) are inserted between the rear grips 510, 610 and the front grips 540, 640 in the jaw installing groove 123 of the master jaws 120, 130, then the clamping bolt 273 must be provided from the outer circumference side of the chuck main body 110.

Figure 19A:
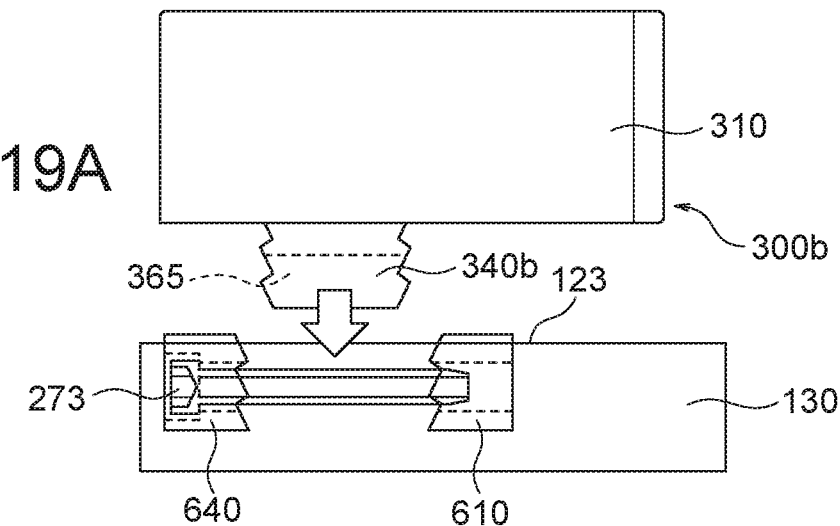
FIG. 19A to FIG. 19C are the diagrams describing the steps of providing the stair form member attached jaw shown in FIG. 18B.
Figure 19B:
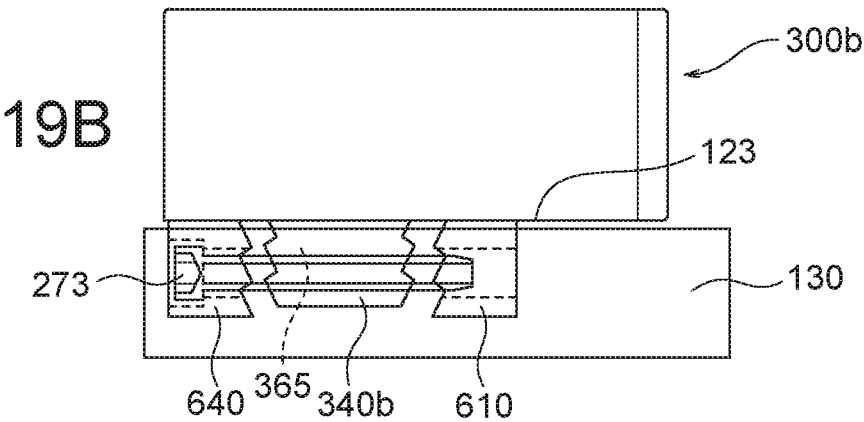
Figure 19C:
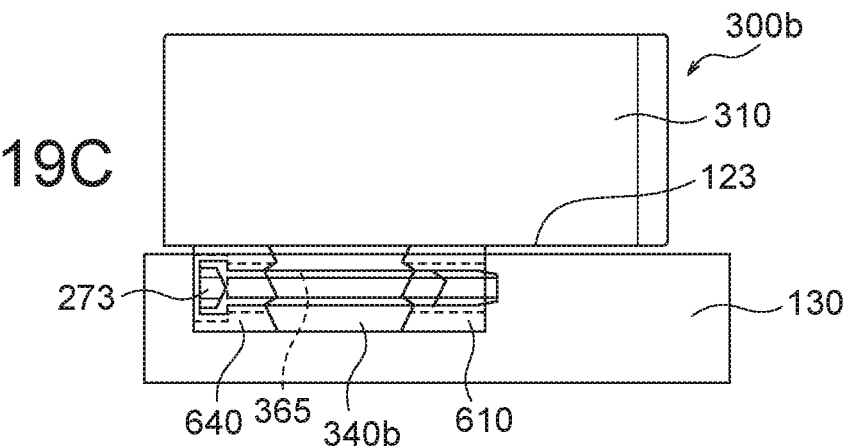

On the other hand, as shown in FIGS. 18A and 18B, for the constitution wherein the U-shaped grooves 265, 365 are formed to the stair form members 240b, 340b, the rear grip 610 and the front grip 640 are inserted to the jaw installing groove 123 of the master jaw 130 and these are connecting (temporary fixing) with the clamping bolt 273, and then the stair form member 340b can be inserted to the jaw installing groove 123, as shown in FIG. 19A. When the stair form member 340b is inserted to the jaw installing groove 123 from the upper opening part of the jaw installing groove 123, the stair form member 340 is pushed into the jaw installing groove 123 while the clamping bolt penetrating U-shaped groove 365 is covering over the clamping bolt 273. Then, as shown in FIG. 19B, at the end, the stair form member 340b is placed between the rear grip 610 and the front grip 640 of the jaw installing groove 123. While in this condition, the clamping bolt 273 is tightened, thereby the stair form member 340b of the stair form member attached jaw 300 is held between the rear grip 610 and the front grip 640.

By using the stair form member attached jaws 200b, 300b of the third embodiment having such constitution, the clamping bolt 273 does not need to be completely pulled out when changing the jaw, thus the working efficiency such as changing the jaw or so can be improved. Also, the risk of the grips 510, 540, 510, 640 falling off from the circumference face of the chuck main body 110 which has faced vertically down can be reduced, thus the work can be done safely and the it can prevent the working efficiency from decreasing.

Fourth Embodiment

Figure 20A:
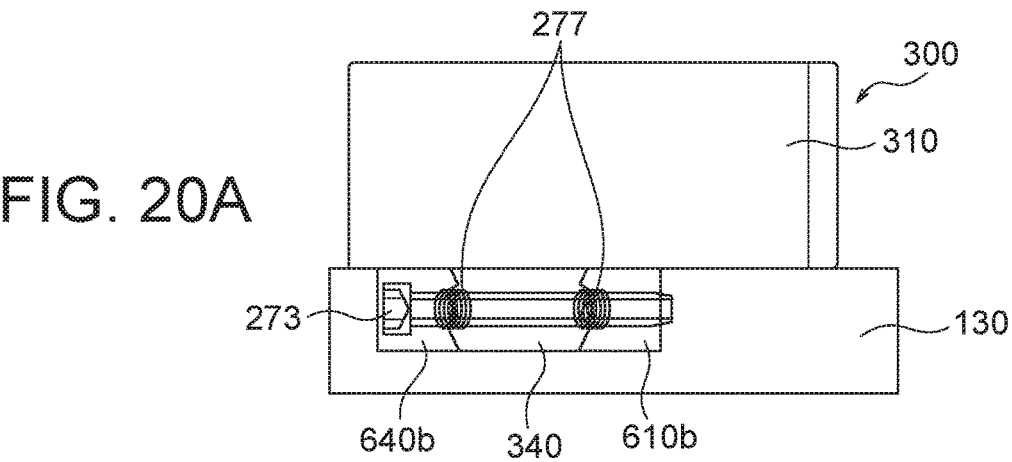
FIG. 20A to FIG. 20C are the diagrams showing the stair form member attached jaw of the fourth embodiment of the present invention.

The fourth embodiment of the present invention will be explained by referring to FIG. 20A to 20C. When holding the stair form member 340 of each stair form member attached jaw of the aforementioned embodiment (for the FIG. 20A to 20C, the stair form member attached jaw 300 of the second embodiment is shown as the example) between the grips 610b, 640b, as shown in FIG. 20A, a spring 277 may be placed between the rear grip 610b and the stair form member 240, and between the stair form member 340 and the front grip 640*b*. For example, the spring 277 may be a coil spring so that the clamping bolt 273 can penetrate through the center thereof, and it is preferable to provide between the stair form member 340 and the grips 610*b*, 640*b*.

Figure 20B:
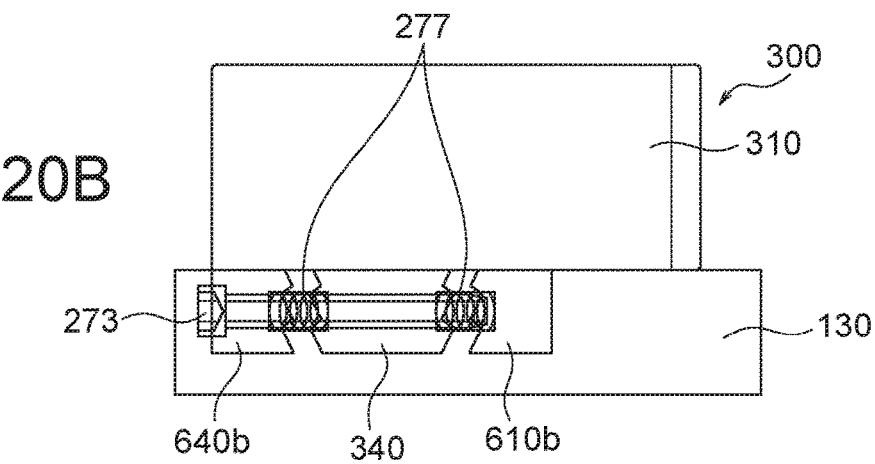

According to such constitution, when removing the stair form member attached jaw 300 from the master jaw 130 by loosening the clamping bolt 273, the rear grip 610*b* and the stair form member 340, and the stair form member 340 and the front grip 640*b* are separated by the spring force of the spring 277, as shown in FIG. 20B. Thereby, the work such as changing the stair form member attached jaws 200, 300 can be done even more efficiently.

Figure 20C:
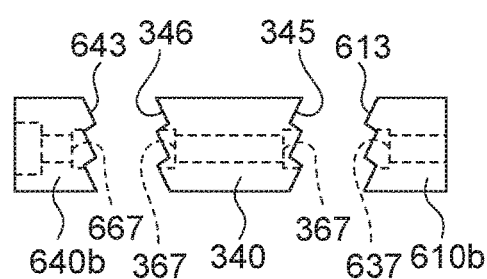

Note that as shown in FIG. 20C for example, in order to place the spring 277 between the stair form member 340 and the grips 610*b*, 640*b*, the counterbores for springs 637, 367, 667 are preferably formed respectively to the holding end face 613 of the rear grip 610*b*, the rear side end face 345 and the front side end face 346 of the stair form member 340, and the holding end face 643 of the front grip 640*b*.

The present invention can be carried out by such embodiment.

Fifth Embodiment

The fifth embodiment of the present invention will be described by referring to FIG. 21A to 23C. In the present embodiment, the chuck mechanism will be discussed of which the holding (installing the stair form member attached jaw) and releasing (removing the stair form member attached jaw) of the stair form member by the grips is done forcibly by rotating the clamping bolt. FIG. 21A is a figure showing the constitution of the rear grip 810, and describes the plan view, the side view, and the backside view. FIG. 21B is the figure showing the constitution of the front grip 840, and the plan view and the side view are shown. FIG. 21C is the figure showing the constitution of the clamping bolt 873. The basic function of the clamping bolt, and the basic structures of the inclined faces 513, 543, and the step faces (the standard faces for pulling down) 515, 545 of the grips 810, 840 are the same as the first embodiment.

In order to carry out the holding and releasing of the stair form member with grips using the rotation of the clamping bolt, the clamping bolt hole 830 formed to the rear grip 810 of the fifth embodiment is formed as a right-handed screw. Also, the clamping bolt hole 860 of the front grip 840 which is used in combination with the rear grip 810 is made as a left-handed screw. As shown in FIG. 21C, the clamping bolt 873 engaging with the rear grip 810 and the front grip 840 is a stud bolt of which a hexagon socket is formed at both end parts 874, 875. Regarding the clamping bolt 873, the right-handed screw is formed at the part 876 which is towards the side of the first end part 874 engaging with the rear grip 810, and left-handed screw is formed at the part 877 which is towards the side of the second end part 875 engaging with the front grip 840.

Figure 22B:
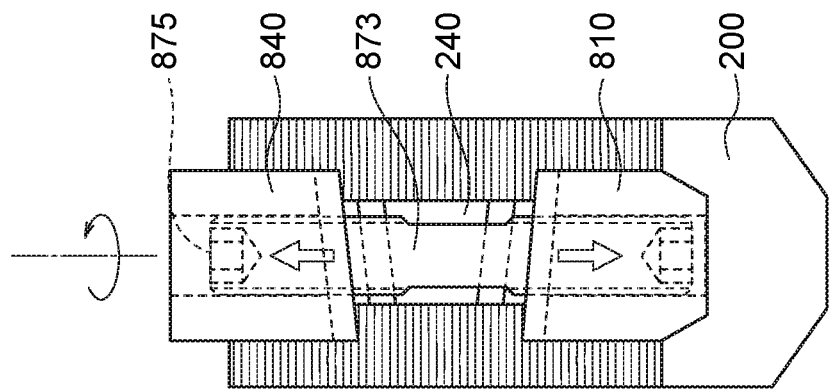
FIG. 22A and FIG. 22B show the stair form member being held and released by the grips and the clamping bolt shown in FIG. 21.
Figure 22A:
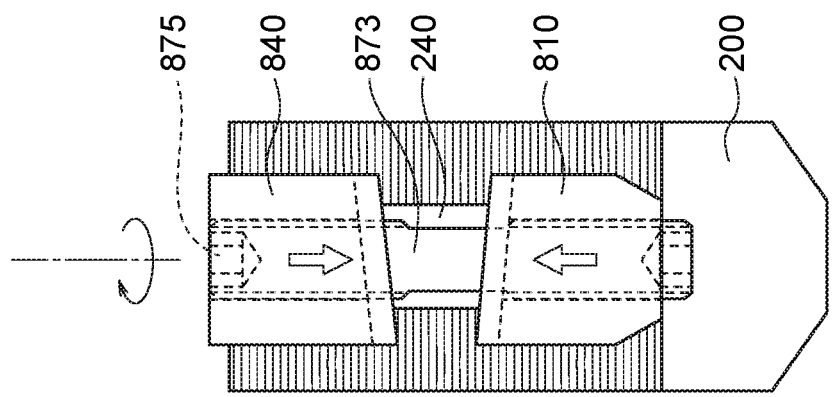

The clamping bolt 873 is engaged with such grips 810, 840, and inserted into the jaw installing groove 123 of the master jaw 120. Then, the clamping bolt 873 is rotated to the right as shown in FIG. 22 by a hexagonal wrench from the outer circumference side of the chuck main body, thereby the rear grip 810 formed with a right-handed screw approaches towards the second end part 875, and the front grip 840 formed with the left-handed screw moves away from the second end part 875. As a result, the grips 810, 840 moves towards closer to each other, and the stair form member 240 of the stair form member attached jaw 200 is tightened, as shown in the figures. Also, if the clamping bolt 873 is rotated to the left as shown in FIG. 22B, the rear grip 810 formed with a right-handed screw moves away from the second end part 875, and the front grip 840 formed with a left-handed screw approaches closer to the second end part 875. As a result, the stair form member 240 of the stair form member attached jaw 200 which has been tightened is loosened as shown in the figures.

Figure 23A:
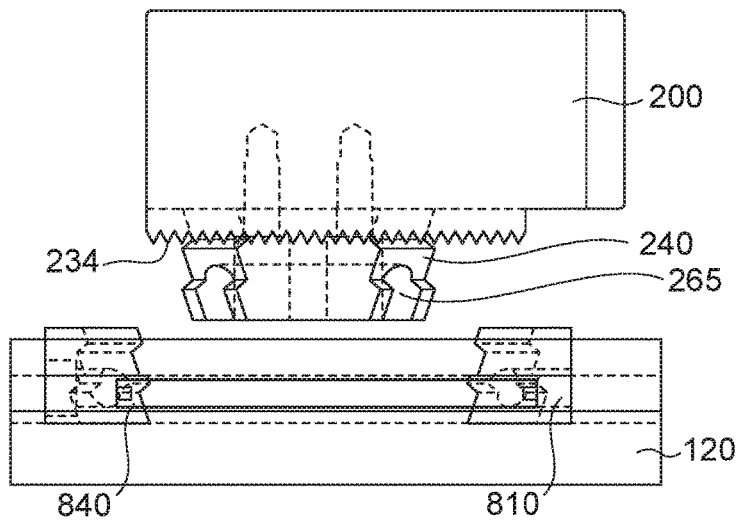
FIG. 23A to FIG. 23C show the step of providing the stair form member using the grips and the clamping bolt shown in FIG. 21.
Figure 23B:
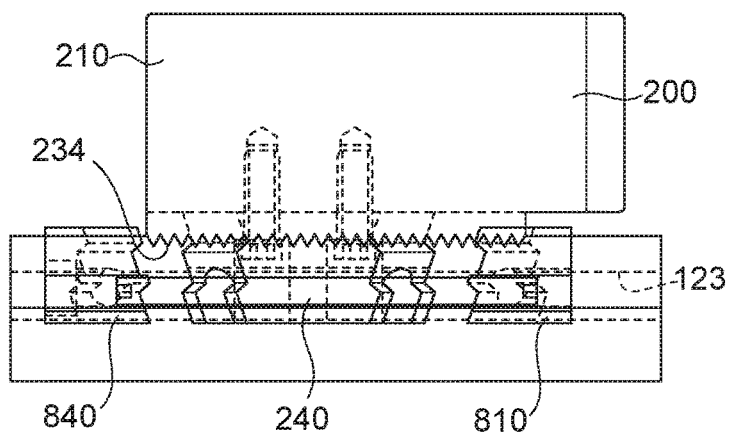
Figure 23C:
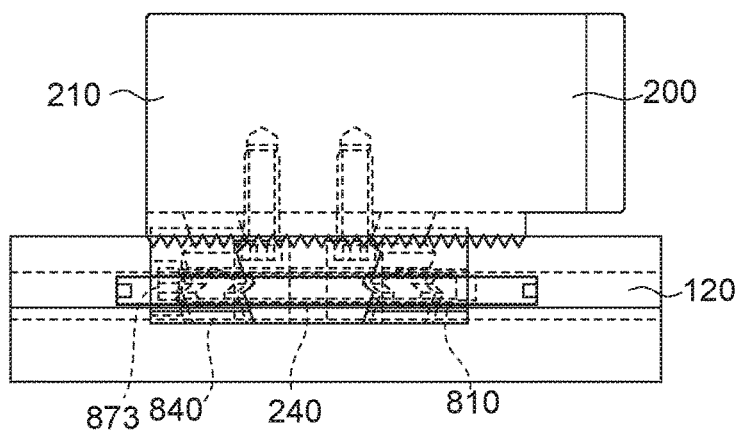

When installing the stair form member attached jaw 200 using such grips 810, 840 and the clamping bolt 873, as shown in FIG. 23A, first the rear grip 810 and the front grip 840 which are connected and temporarily fixed by clamping bolt are inserted into the jaw installing groove 123 of the master jaw 120. Next, as shown in FIG. 23B, the stair form member attached jaw 200 is inserted into the master jaw 120 from the upper opening of the jaw installing groove 123 so that the center part of the clamping bolt 273 enters the clamping bolt penetrating U-shaped groove 265 of the stair form member 240. Then, as mentioned in above, the clamping bolt 873 is rotated to the right, thereby the stair form member 240 is tightened by the rear grip 810 and the front grip 840, and as shown in FIG. 23C, the stair form member attached jaw 200 is provided to the master jaw by the rear grip 810 and the front grip 840.

Also, when removing the stair form member attached jaw 200 from the master jaw 120, the clamping bolt 873 is rotated to the left, and the rear grip 810 and the front grip 840 move away from each other, thus as a result the holding of the stair form member 240 is released. As shown in FIG. 23B, once the rear grip 810 and the front grip 840 are moved away so that the stair form member 240 of the stair form member attached jaw 200 does not interfere with the rear grip 810 and the front grip 840, the stair form member attached jaw 200 can be removed from the upper opening of the jaw installing groove 123.

As such, for the chuck mechanism of the fifth embodiment, due to the rotation in the predetermined direction of the clamping bolt 873 (the rotation to the right in the present embodiment), the rear grip 810 and the front grip 840 move to the direction making the space in between smaller; and by the rotation to the opposite direction (the rotation to the left in the present embodiment), the rear grip 810 and the front grip 840 moves to the direction to widen the space in between. Therefore, by rotating the clamping bolt 873, the stair form member attached jaw 200 can be provided (clamped) and removed (unclamped), thus the stair form member attached jaw 200 can be changed efficiently.

Particularly, in the constitution of the present embodiment, the rotation of the clamping bolt 873 and the movement of the grips 810, 840 are connected; therefore the grips 810, 840 are forcibly moved by the rotation of the clamping bolt 873. As a result, the stair form member attached jaw 200 can be securely provided (clamped) and removed (unclamped). Also, the amount of the rotation of the clamping bolt 873 corresponds to the amount of the movement of the rear grip 810 and the front grip 840, thus the space, the position and the amount of movement between the rear grip 810 and the front grip 840 can be strictly regulated. Such constitution is extremely effective when using for the system such as automatically changing the jaw or so, from the point of easiness to apply, the precision and the reliability or so.

Note that, the relation between the grips 810, 840 with the right-handed screw and the left-handed screw of the rear side 876 and the front side part 877 of the clamping bolt 873 are not limited to the aforementioned example; and the rear side part 876 and the rear grip 810 may have the left-handed screw, and the front side part 877 and the front grip 840 may have the right-handed screw.

Also, for the rear grip 810 of the present embodiment, as shown in FIG. 21A, a chamfered face 816 is formed at the lower part of the inner diameter side end face 514. By having such chamfered face 816, the rear grip 810 can be easily inserted to the jaw installing groove 123 of the master jaw 120 from the outer diameter side of the chuck. Similar chamfered face may be provided to the front grip 840. Such constitution is also extremely effective in case of using for the system such as automatic changing of the jaw or so.

Also, in order to effectively use the soft jaw, the soft jaw having the both end parts of the inner diameter side and the outer diameter side formed as the workpiece holding part capable of holding the workpiece is considered. In such case, the stair form member attached jaw needs to be installed to the chuck main body by changing the direction of the inner and outer diameter direction of the stair form member attached jaw. In regards to this matter, as shown in FIG. 21C, the clamping bolt 873 of the present embodiment has the both end parts 874, 875 have the hexagonal hole without the head, hence both end parts can be used as the outer diameter side of the chuck, the rear grip 810 and the front grip 840 can be interchangeably installed to the jaw installing groove 123. As a result, even in case of the stair form member attached jaw comprising the stair form member having the planar shape of an isosceles trapezoid shape as shown in the first embodiment, it can be interchangeably installed to the chuck main body even when the direction of the inner and outer diameter direction is interchanged. That is, by using the clamping bolt 873 shown in FIG. 21C, the stair form member attached jaw of which the stair form member having the planar shape of an isosceles trapezoid shape is integrally formed with the soft jaw which the both end parts at the inner diameter side and the outer diameter side are formed as the workpiece holding part capable of holding the work piece, can be used in a form allowing an effective use of the both end of the workpiece holding parts. Note that, regarding the stair form member attached jaw shown in the second embodiment wherein the planar shape of the stair form member is rectangular parallelepiped shape, the rear grip and the front grip can be installed to the chuck main body even without changing the direction of the inner and outer diameter direction thereof, thus these can be used in a form allowing the effective use of the both end of the workpiece holding parts.

In either embodiment of the stair form member having a planar shape of an isosceles trapezoid shape or a rectangular parallelepiped shape, by using the stair form member attached jaw comprising the soft jaw which the both end parts of the inner diameter side and the outer diameter side are formed as the workpiece holding part capable of holding the workpiece as discussed in each embodiment mentioned in above, the position of the soft jaw can be determined easily and highly precisely; and also a highly economic stair form member attached jaw can be provided. As a result, the soft jaw can be used effectively and economically, and the chuck mechanism or the machine tool capable of reducing the cost of production can be attained. The chuck mechanism, the stair form member attached jaw, and the machine tool of such embodiments is also within the scope of the present invention.

Sixth Embodiment

The sixth embodiment of the present invention will be described by referring to FIGS. 24A and 24B. The serration face of the stair form member attached jaw of each embodiment mentioned in above is formed to the entire area along the longitudinal direction of the soft jaw (the entire area except near the workpiece holding part 211) at the both sides in the width direction of the soft jaw, for example the serration faces 234, 234 shown in FIG. 4B. However, the serration face may be formed selectively to the bottom face of the soft jaw 210 of the stair form member attached jaw 200. The stair form member attached jaw having such constitution is shown as the sixth embodiment of the present embodiment.

Figure 24A:
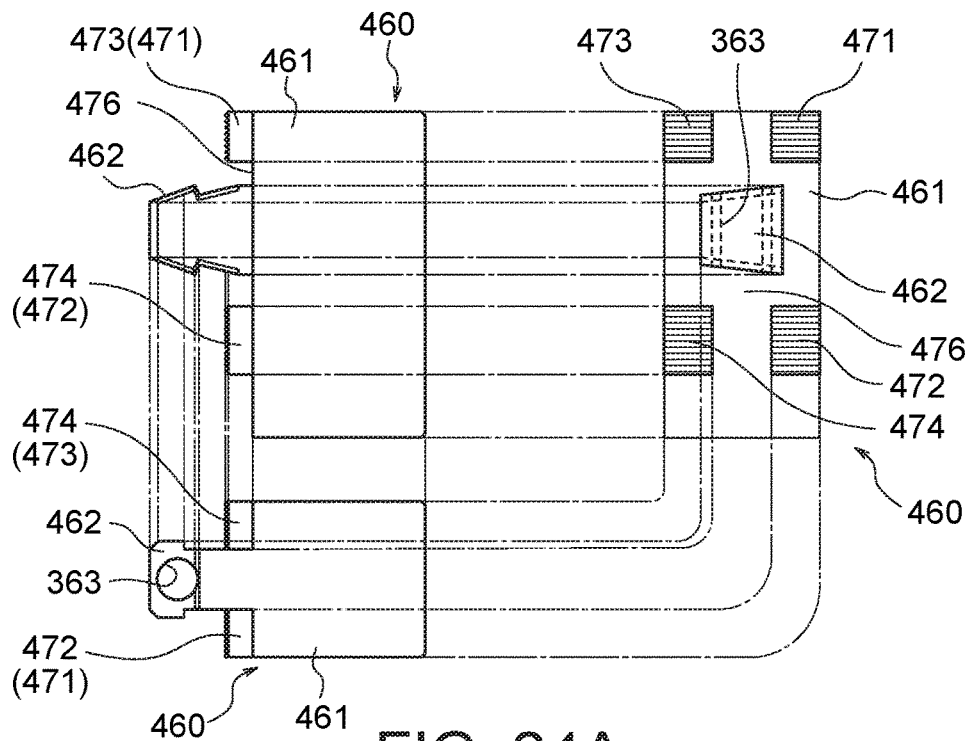
FIG. 24A and FIG. 24B are the diagrams showing the stair form member attached jaw of the sixth embodiment of the present invention.

The stair form member attached jaw 460 shown in FIG. 24A comprises the soft jaw 461 and the stair form member 462. As similar to the stair form member 240 of the stair form member attached jaw 200 of the first embodiment, the stair form member 462 has a cross section of isosceles trapezoid shape in the horizontal direction, and the clamping blot penetrating hole 363 is formed to the stair form member. At the bottom face of the soft jaw 461, as shown in the figure, the serration faces 471 to 474 are formed at the four positions which roughly correspond to the four corner positions of the serration faces in conventional two rows. Each serration faces 471 to 474 are the bilateral serrations wherein the saw teeth are formed in the width direction of the soft jaw.

Figure 24B:
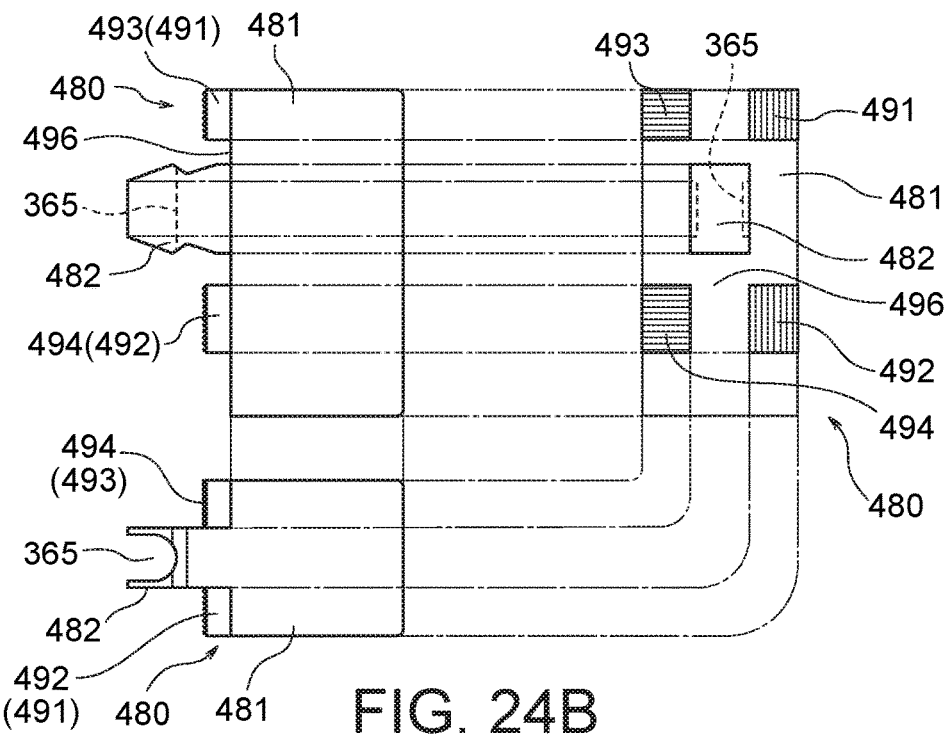

Also, the stair form member attached jaw 480 shown in FIG. 24B comprises the soft jaw 481 and the stair form member 482. As similar to the stair form member 340 of the stair form member attached jaw 300 of the second embodiment, the stair form member 482 has the cross section of rectangular shape in the horizontal direction, and the clamping bolt penetrating U-shaped groove 365 is formed to the stair form member. At the bottom face of the soft jaw 481, as shown in the figure, the serration faces 491 to 494 are formed at the four positions which roughly correspond to the four corner positions of the serration faces in conventional two rows. Among these, the serration faces 491, 492 are the vertical serrations wherein the saw teeth are formed in the length direction of the soft jaw 481, and the serration faces 493, 494 are the bilateral serrations wherein the saw teeth are formed in the width direction of the soft jaw 481.

For either of the stair form member attached jaws 460, 480 shown in FIGS. 24A and 24B, the lengths of the serration face 471 to 474, and 491 to 494 in the longitudinal direction of the soft jaws 461, 481 are short. Also, the serration faces 471 to 474, and 491 to 494 are formed in "an island form" which project out from the bottom face of the soft jaws 461, 481. Also, the serration faces are not formed around the stair form members 462, 482, and the opened spaces 476, 496 are formed.

The stair form member attached jaws 460, 480 having such constitution comprises the characteristics of the stair form member attached jaw of each embodiment mentioned in the above, and also can easily produce the entire stair form member attached jaws 460, 480 as one body. That is, the area near the stair form members 462, 482 are the opened spaces 476, 496 which are not formed with the serration faces 471 to 474, 491 to 494, thus when forming the stair form members 462, 482 and the serration faces 471 to 474 and 491 to 494, the spaces 476, 496 can be used as the space for the processing. In other words, by securing such spaces 476, 496, the stair form members 462, 482 can be easily formed integrally. As a result, the stair form member attached jaw with high precision can be provided, and also the stair form member attached jaw can be produced with low cost, furthermore the production cost of the product which is processed using the stair form member attached jaw can be also reduced. The present invention may be carried out in such embodiment.

Note that, the soft jaw 461 of the stair form member attached jaw 460 shown in FIG. 24A has the cross section shape in the height direction of T-shape. Therefore, as similar to the grip, it needs to be inserted to the jaw installing groove 123 of the master jaw 120 from the outer circumference side, but the stair form member attached jaw does not fall off from the end face (surface) of the chuck main body, and it is effective from the point of securing the safety. The present invention may be carried out in such embodiment. Note that, the combinations of the shape of the serration (vertical/bilateral), the shape of the stair form member (trapezoid/rectangular parallelepiped, T-shaped/ straight), and the clamping bolt penetrating structure (hole/ groove) or so are not limited to those shown in FIGS. 24A and 24B, and any arbitrary combinations can be used for constituting the stair form member attached jaw.

Seventh Embodiment

The seventh embodiment of the present invention will be described by referring to FIG. 25A to 25C. As the seventh embodiment of the present invention, the stair form member attached jaw 700 and the chuck main body 170 will be described capable of preventing dusts and cutting wastes generated during the processing from entering or adhering to the surrounding area or to the inside of the stair form member attached jaw and the chuck main body, and enabling highly precise workpiece processing. As shown in FIG. 25B, the stair form member attached jaw 700 of the seventh embodiment is installed with a wiper blade 710 around the lower part of the stair form member attached jaw of each embodiment discussed in above (in FIG. 25B, the stair form member attached jaw 300 is shown as an example).

As shown in FIG. 25A, the wiper blade 710 is installed to the lower part of the stair form member attached jaw 300 in the entire face except for the end face (the end face which is the outer circumference side of the chuck main body 170) which is the opposite side of the workpiece holding part 311 of the stair form member attached jaw 300. The wiper blade 710 is the resin member and metallic member having the cross section of L-shape, and it is a member so-called "a slide seal" or "a lip seal". For the wiper blade 710, one of the face of the L-shaped cross section is the installing face which is installed to the lower part of the stair form member attached jaw 300, and as shown in FIG. 25B, it is provided to the bottom face of the stair form member attached jaw 300 using the screw 715 having predetermine space between each other. Also, for the wiper blade 710, other face of the L-shaped cross section contacts with and seals the surface of the dust proof plate 175 provided at the chuck main body 170, thereby prevents the dust and the cutting waste from entering from the boundary to the inside of the serration part formed to the stair form member attached jaw 300 or to the master jaw 120, and to the jaw installing groove 123 of the master jaw 130.

Also, at the chuck main body 170 of the seventh embodiment, the dust proof plate 175 is provided to the end face 112. As shown in FIG. 25A to 25C, the dust proof plate 175 is a flat plate having a predetermined thickness provided to the end face of the chuck main body 170. As shown in FIG. 25A, the dust proof plate is formed with a notch 178 having a rectangular parallelepiped shape, which enables the stair form member attached jaw 300 to be installed to the master jaw 120. The notch 178 is formed at the area which does not interfere with the top face of the master jaw 120 exposed to the end face of the chuck main body 170.

In case the stair form member attached jaw 700 is provided to the chuck main body 170 comprising such dust proof plate 175, when opening and closing the jaw to chuck the workpiece, the stair form member attached jaw 300 and the wiper blade 710 moves together on the plate, as indicated by the arrow of FIG. 25A. Thereby, even if dusts and cutting wastes are produced during the processing, the cutting wastes or so can be prevented from entering to the surrounding area or to the inside of the stair form member attached jaw and the chuck main body, that is to the serration part of the stair form member attached jaw 300 or the master jaws 120, 130, or to the inside of the jaw installing groove 123. As a result, the stair form member attached jaw can be accurately positioned, and the workpiece can be processed with even higher precision. Note that, in case of changing the jaw or so, in order to prevent dusts from entering to the serration part, air is blown to the notch part 175 of the dust proof plate 175 to blow a high pressured air, thereby the dust is preferably removed. That is, by providing the high pressured air hole to the radial direction or to the rotating direction, dusts can be prevented even more. The present invention can be done with such embodiment.

Other Embodiment

The present invention is not limited to the above mentioned embodiments, and various modifications can be made.

For example, each waveform engaging face formed at the rear side end face and the front side end face of the stair form member are not limited to the constitution described by referring to FIG. 7E. For example, the length in the height direction of the engaging face may be longer, and may be longer than the connecting face. Also, the inclination angle of the engaging face and the connecting face may be preferable angle accordingly. Also, the engaging faces are not limited to two faces, and it may be only one face or may be three or more faces. Also, the connecting faces may be two faces or less and 4 faces or less. Also, the connecting faces do not need to be inclined faces. The stair form member is held between the grips from the both sides and tightened while being inserted in the jaw installing groove of the master jaw, thereby the wave engaging faces formed to the stair form member pulls down the stair form member towards the direction of the bottom part of the jaw installing groove. In order to exhibit such function, at least one face of the inclined face needs to be formed which directs towards the upper opening direction of the jaw installing groove while the stair form member is inserted to the jaw installing groove of the master jaw, and other conditions may be changed accordingly.

Also, depending on the embodiment of the waveform engaging face of this stair form member, the inclined face and the counter waveform engaging face of the grips may be changed. As mentioned in the above, each waveform engaging face of the stair form member only needs to be formed with one face of the inclined face directing towards the upper opening of the jaw installing groove while the stair form member is inserted to the jaw installing groove of the master jaw, thus as long as the counter waveform engaging face of the grips engaging therewith is constituted so as to press the inclined face by contacting with at least one face of the inclined face of the stair form member, other conditions may be changed accordingly. That is, the counter engaging face of the grips or so is not limited to the constitution discussed in above by referring to FIGS. 9C and 9F. The length in the height direction, the inclination angle, and the number of the face provided to the counter engaging face or the counter connecting face constituting the counter waveform engaging face may be arbitrarily changed depending on the embodiment of the waveform engaging face of the stair form member. Even in case of the constitution of pressing the engaging face (the inclined face of at least one face) of the stair form member, it does not necessarily have to be the face (the counter engaging face) opposing the engaging face (the inclined face) thereof; and it may be a constitution wherein a step is formed by projecting out to the height direction from the inclined face and the holding end face which is the end face of the stair form member side of the grips. For example, it may be a ridge form part with edge, or one or plurality of projection parts extending along the stretching direction of the jaw installing groove of the master jaw.

Figures 17A, 17B:
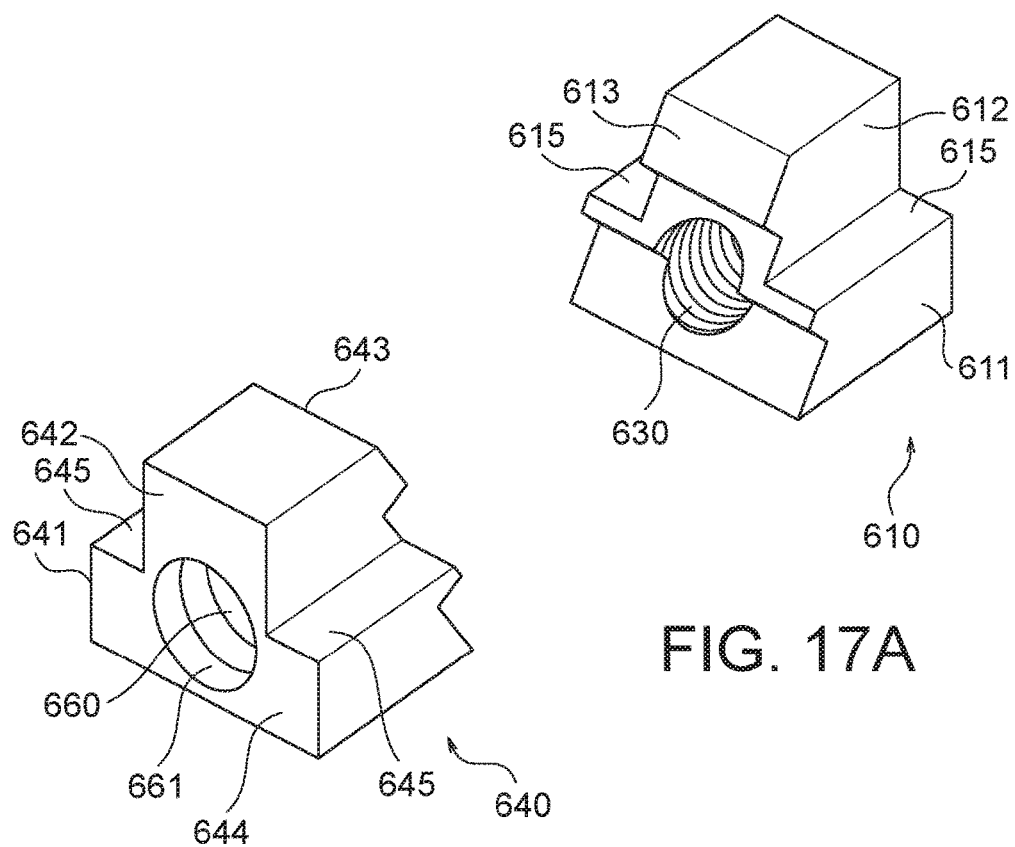
FIG. 17A and FIG. 17B are the diagrams showing the constitution of the grips of the second embodiment.
Figure 26A:
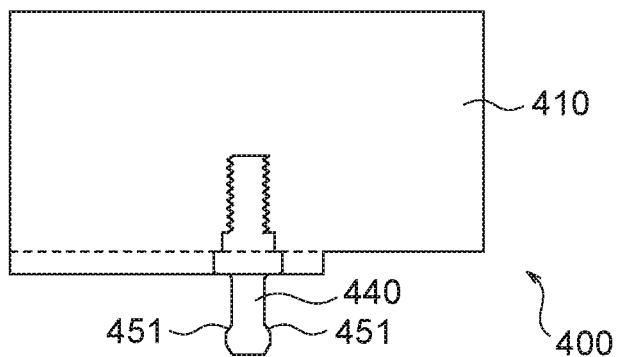
FIG. 26A to FIG. 26C are the diagrams showing other embodiments of the stair form member attached jaw of the present invention.
Figure 26B:
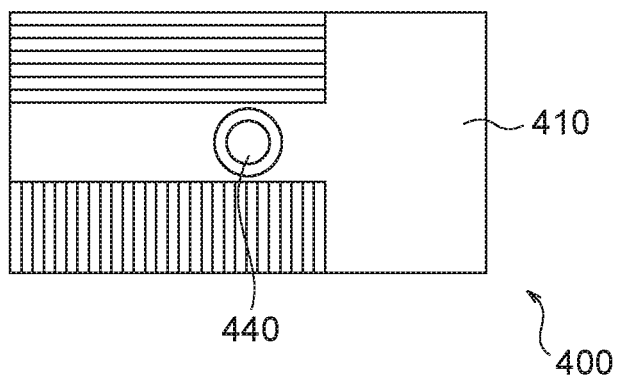
Figure 26C:
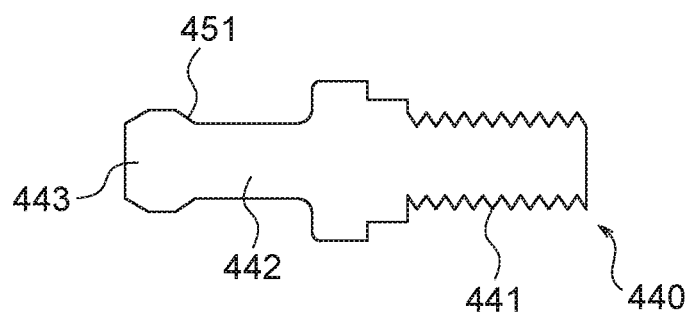

As the stair form member attached jaw of the present invention having the stair form member having such simple constitution, for example the stair form member attached jaw 400 shown in FIGS. 26A and 26B may be mentioned. The stair form member attached jaw 400 is provided with the pull stud bolt 440 at the bottom face center part of the jaw 410. As shown in FIG. 26C, in general, the pull stud bolt 440 is formed with a screw part 441 at one end side of the axial direction, and on the other end side, the head part 443 is formed via the axial part 442, and the taper face 451 is formed between the head part 443 and the axial part 442 as shown in the figure. In the stair form member attached jaw 400, the taper face 451 of the this pull stud bolt 440 is used as the engaging face 451 with the grips, and the jaw 410 is drawn into the jaw installing groove 123 of the master jaw 120. As the counter engaging face of the grips, it may be a straight counter engaging face as shown in FIGS. 17A and 17B, or it may be the counter engaging face of a round shape along the shape of the head part 443 or the taper face 451 of the pull stud bolt 440. The stair form member 400 having such constitution also exhibits the same function and effect as the stair form member attached jaw of each embodiment discussed in the above.

Also, the serration formed to the soft jaw and the master jaw is not limited to the embodiment mentioned in the above, and it may be changed accordingly. For example, in the above mentioned second embodiment, the spikes 134a are formed at the serration face 134 of the master jaw 130, and the saw teeth in a line form are formed to the serration faces 373, 374 of the soft jaw 310. However, the spikes may be formed to the serration face of the soft jaw 310, and the saw teeth in a line form may be formed to the serration face of the master jaw 130. Also, the serration formed to the soft jaw and the master jaw is not limited to two types of saw teeth which intercept vertically with each other. The two types of saw teeth stretching in different direction only need to be included, and the crossing angle of the saw teeth may be any angle. For example, it may be two types of saw teeth stretching in the direction intersecting at 60° with each other.

Also, the cross section shape of saw teeth or the spike of the serration formed to the soft jaw and the master jaw is not limited to the triangular shape. As long as the saw teeth or the spike formed to the soft jaw makes a surface contact with the saw teeth or the spike formed at the master jaw, the shape of the saw teeth or the spike can be any shape. Further, the pitch of the saw teeth or the saw teeth formed to the soft jaw and the master jaw may be any pitch. Also, the means for determining the position formed to the soft jaw and the master jaw is not limited to the serration having a "V groove" as discussed in the above, and the means for determining the position may be "a square form" or "a round form". The stair form member attached jaw comprising such means for determining the position, the chuck mechanism and the machine tool having thereof are also within the scope of the present invention.

Also, in each embodiment discussed in above, the step face (the shoulder part, the supporting face for pulling down) of the jaw installing groove of the master jaw and the step face (the standard face for pulling down) of each grip function as the locking part, but the embodiment of the locking part may be any embodiment. For example, it may be "a dovetail groove" (triangular shape) as shown in FIG. 27A, or it may be "a round groove" (round shape) as shown in FIG. 27B. As long as these lock with each other and restrict the movement, it may be any embodiment.

Also, the workpiece held by the chuck mechanism of the present invention is not limited to circular ring shape, and it may be any arbitrary shape. For example, as for the workpiece having an eccentric shape or a polygonal prism shape, by matching the shape of the workpiece holding part of the soft jaw to the shape of the workpiece, the chuck mechanism of the present invention can be used. Further, for the aforementioned embodiment, the example of holding the workpiece from the outside was shown, but the chuck mechanism of the present invention can be used for holding the workpiece from the inside.

Furthermore, the size, the material, the shape, and the position of the soft jaw, the stair form member, the grips and the master jaw can be changed or set arbitrary depending on the shape and the material or so of the workpiece as long as it is within the scope in which the function of the present invention can be exhibited. Also, in the aforementioned embodiments, the example of using the lathe to the present invention was described but the present invention can be used for machine tool other than lathe. For example, as for the case of a milling machine or a machining center, the chuck mechanism of the present invention can be applied to the machine tool processing the workpiece using the blade moving at a high speed while fixing the work piece to the chuck mechanism.

The invention claimed is:

1. A chuck mechanism holding a workpiece, comprising;
a chuck main body,
plurality of master jaws provided to an end face of said chuck main body, and each of said plurality of master jaws comprising a jaw installing groove extending in a radial direction of the end face of said chuck main body,
plurality of stair form member attached jaws provided to each of said master jaws, each of said stair form member attached jaws comprising a jaw for holding said workpiece and a stair form member inserted in said jaw installing groove of said master jaw,
pairs of grips inserted to each of said jaw installing grooves of said master jaws, each of said pair of grips holding said stair form member of said stair form member attached jaw from an inner diameter side and an outer diameter side of said jaw installing groove, and
positioning parts formed at upper parts of said master jaws and lower parts of said jaws to determine positions of said jaws at the end face of said chuck main body, wherein
an inner diameter side end face and an outer diameter side end face of said stair form member are formed with engaging faces, each of said engaging faces comprising an inclined face to a direction of an upper opening direction of said jaw installing groove when said stair form member is inserted to said jaw installing groove of said master jaw, an end face of each of said pairs of grips opposing to said inner diameter side end face or said outer diameter side end face of said stair form member is formed with an opposing engaging part contacting with said engaging face of said stair form member to act a force on said engaging face towards a direction of a bottom of said jaw installing groove when said stair form member is held, and each of said pairs of grips comprises a locking part contacting with a predetermined locking part of said jaw installing groove of said master jaw to regulate a movement of said grip to an opposite direction of said direction of the bottom, wherein a resilient member acting a force in a direction to separate said grip and said stair form member is provided between each of said pair of grips and said inner diameter side end face or said outer diameter side end face of said stair form member of said stair form member attached jaw.

2. The chuck mechanism as set forth in claim 1, wherein said inner diameter side end face and said outer diameter side end face of said stair form member are respectively provided with plurality of said engaging faces, and said end face of each of said pairs of grips is provided with plurality of said opposing engaging parts opposing against plurality of said engaging faces of said stair form member.

3. The chuck mechanism as set forth in claim 1, wherein said inner diameter side end face and said outer diameter side end face of said stair form member are formed so that these are inclined to a direction of either one of the side faces of said jaw installing groove when said stair form member is inserted in said jaw installing groove, and said end face of each grip of said pair of grips opposes against said inner diameter side end face or said outer diameter side end face of said stair form member when said grip is inserted in said jaw installing groove, and said end face is inclining towards a direction of a stair form member positioning face which is the other side face of said jaw installing groove.

4. The chuck mechanism as set forth in claim 1, wherein said stair form member of said stair form member attached jaw comprises a clamping bolt penetrating part penetrating between said inner diameter side end face and said outer diameter side end face, and said pair of grips hold said stair form member from both sides by engaging both end parts of a clamping bolt penetrating said clamping bolt penetrating part with said pair of grips.

5. The chuck mechanism as set forth in claim 4, wherein one of said pair of grips comprises a hole formed with either one of right-handed screw or a left-handed screw to engage with said clamping bolt, other one of said pair of grips comprises a hole formed with either of other one of the right-handed screw or the left-handed screw to engage with said clamping bolt, and at positions of said clamping bold where said clamping bolt engages with said pair of grips, the right-handed screw or the left-handed screw corresponding to said grip to be engaged at the position is respectively formed.

6. The chuck mechanism as set forth in claim 1, wherein said jaw installing groove of said master jaw has a cross section of T-shape, and said stair form member of said stair form member attached jaw has a cross section of T-shape capable of inscribing to said jaw installing groove of said master jaw.

7. The chuck mechanism as set forth in claim 1, wherein a dust proof plate is provided at the end face of said chuck main body, and said dust proof plate is a flat plate covering said end face and is formed with notches so that said dust proof plate does not interfere with said master jaw.

8. A machine tool comprising a chuck mechanism as set forth in claim 1.

* * * * *